(12) United States Patent
Itakura et al.

(10) Patent No.: US 6,744,782 B1
(45) Date of Patent: Jun. 1, 2004

(54) COMMUNICATIONS DEVICE, METHOD THEREOF, COMMUNICATIONS SYSTEM AND RECORDING MEDIUM

(75) Inventors: Eisaburo Itakura, Kanagawa (JP); Atsushi Okamori, Tokyo (JP)

(73) Assignee: Sony Corporation, Tokyo (JP)

( * ) Notice: Subject to any disclaimer, the term of this patent is extended or adjusted under 35 U.S.C. 154(b) by 675 days.

(21) Appl. No.: 09/630,012

(22) Filed: Jul. 31, 2000

(30) Foreign Application Priority Data

Aug. 4, 1999 (JP) .......................................... P11-220728

(51) Int. Cl.[7] .................................................. H04J 3/16
(52) U.S. Cl. ............... 370/466; 370/395.6; 370/395.64; 370/465
(58) Field of Search ................................ 370/466, 467, 370/469, 474, 503, 508, 509, 510, 395.65, 395.1, 395.52, 395.6, 395.62, 395.64, 465, 507, 511, 512, 513, 514

(56) References Cited

U.S. PATENT DOCUMENTS 6,097,739 A * 8/2000 Yamashita .................. 370/528
6,243,395 B1 * 6/2001 Fujimori et al. ............ 370/466
6,339,597 B1 * 1/2002 Osaki .................... 370/395.65
6,373,856 B1 * 4/2002 Higashida ................... 370/474
6,377,588 B1 * 4/2002 Osaki ........................ 370/508
6,493,832 B1 * 12/2002 Itakura et al. .............. 713/600

OTHER PUBLICATIONS

M. Perkins et al, "A Hardware MPEG Clock Recovery Experiment in the Presence of ATM Jitter," ATM Forum Technical Committee, May 1994, ATM 94-0434.
G. Franceschini, "Extension of the Adaptive Clock Method to Variable Bit Rate Streams," ATM Forum Technical Committee (SAA Sub–Working Group), Apr. 1994, ATM 94–0321.

* cited by examiner

Primary Examiner—Phirin Sam
(74) Attorney, Agent, or Firm—Sonnenschein, Nath & Rosenthal LLP

(57) ABSTRACT

A communications device and method thereof, a communications system and a recording medium to transmit information for control exceeding one byte. A synchronizing information adder stores in a CPCS-PDU trailer, synchronizing information to control the operation of a receiver. An MPEG/ATM converter transmits a packet of data converted from the synchronizing information stored in the synchronizing information adder.

11 Claims, 25 Drawing Sheets

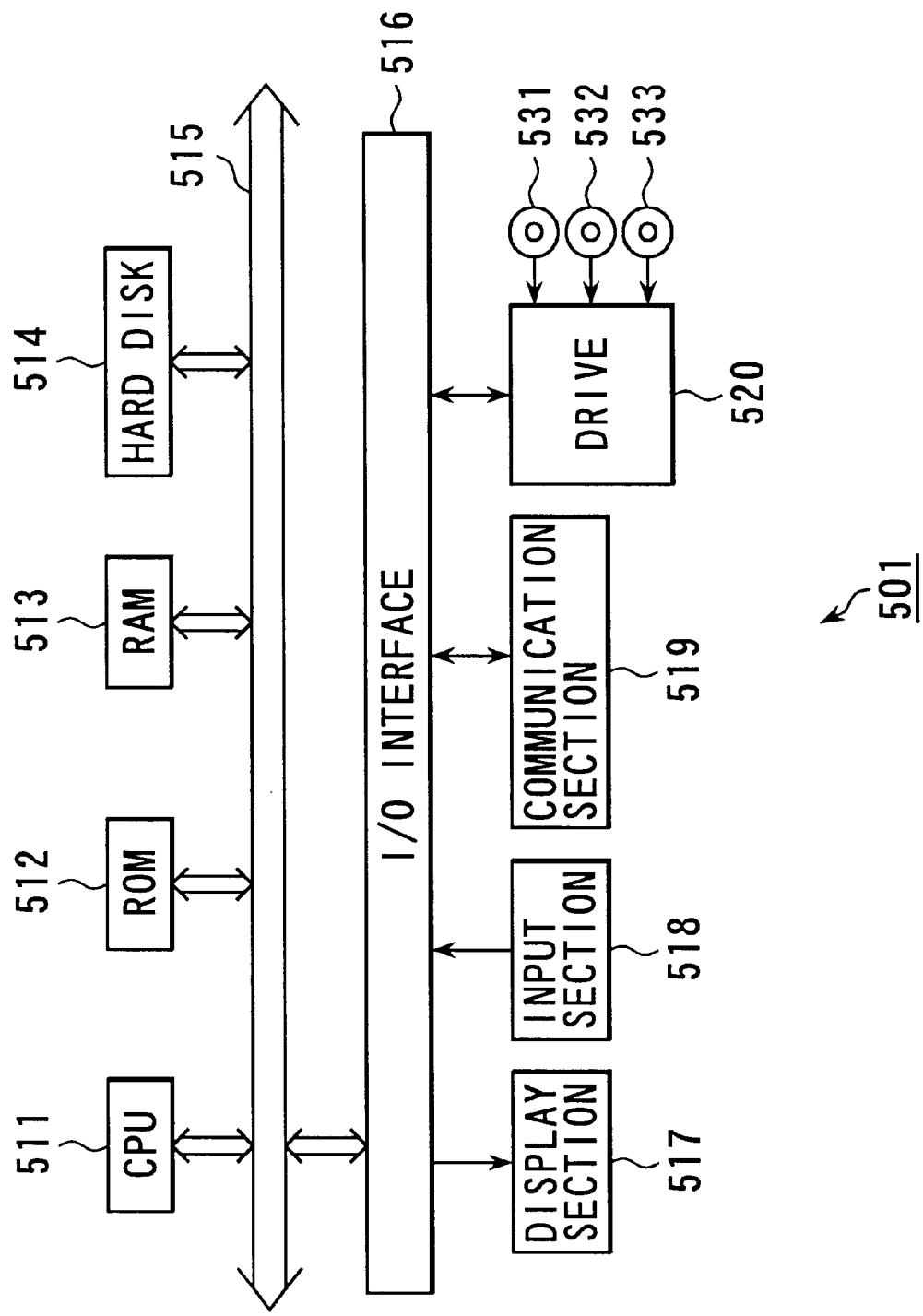

COMMUNICATIONS DEVICE, METHOD THEREOF, COMMUNICATIONS SYSTEM AND RECORDING MEDIUM

BACKGROUND OF THE INVENTION

1. Field of the Invention

This invention relates to a communications device, method thereof, a communications system and a recording medium, and relates in particular to a communications device, method thereof, a communications system and a recording medium to transmit and receive information for control exceeding one byte.

2. Related Art

Decoders for applications utilizing digital audio and images, perform decoding for instance of data output from an information generator source such as encoders, and of encoded and recorded data, while synchronizing with a clock pulse. If the decoder were capable of controlling the information generator source, then the decoder could adjust the data rate of the data that was sent and thus be dependent only on the timing of the received data, and then decode the data, and display the image or reproduce the audio.

However, when data is sent to the decoder by way for instance of a network, and the decoder possesses no control of the information generator source, the information generator source and the decoder are operated by respective, independent system clocks. The encoding, transmission, receiving, decoding and display processing are therefore performed by the information source generator and decoder based on their respective system clocks. The system clocks in such cases, do not have a common clock to refer to, so that a deviation or discrepancy occurs between the respective system clock frequencies of the information generator source and the decoder.

In this way, when two system clocks are not synchronized, the data sent from the information generator source, and the data decoded by the decoder have different data rates, and the decoder receive buffer overflows or underflows and so the data that was sent is lost. Therefore, when image data for instance is being received, and an underflow occurs, the receiver must again display the frame.

One method to synchronize the decoder system clock with the information generator source system clock is by utilizing information showing the time (time stamp). In an MPEG transport stream, a PCR (Program Clock Reference) is used as a time stamp so that the respective system clocks can be synchronized with each other.

The concept of synchronization in the MPEG transport stream is shown in FIG. 1. The information generator source (transmit side) is operated by a corresponding system clock 1 at a specified frequency. Fixed intervals are not required but the value of a counter counting each system clock 1 is latched at each period, and that counter value is sent to the decoder (receive side). This value is called the time stamp, and the decoder uses this value to synchronize its own system clock 2 with the system clock 1 of the information generator source. More specifically, the count value and the time stamp that was received, are compared in the decoder and based on the comparison results, the system clock 2 on the receive side is made to speed up or slow down.

Synchronization methods such as this are utilized in the MPEG-2 system layer (ISO/IEC13818-1) and ITU-T report. In MPEG-2, a 27 MHz system clock is used in the encoder and decoder. The structure of a system for transmitting data configured for MPEG-2 over a network is shown in FIG. 2. The information generator source is for instance an encoder device such as the encoder 11. The pre-encoded data is accumulated in a data storage device, and this data storage device can be used as the information generator source.

The MPEG-2 data generated in the encoder 11 is input to the system encoder 12. The system encoder 12 adds a time stamp to the MPEG-2 data generated in the encoder 11, packetizes the data, and performs multiplexing to generate an MPEG transport stream packet (hereafter called transport stream packet). An MPEG/ATM converter 13 converts the transport stream packet to ATM cells, and sends them to the receive side by way of the network 14. The transport stream packet is susceptible to various effects of delay distortion inside the network 14 when sending to the receive side. The generation of the delay distortion in the ATM is related later on.

The transport stream (time stamp) containing delay distortion is packetized in the MPEG converter 15, input to the system decoder 16 and processed in the system decoder 16. The decoder system clock is reproduced from the time stamp in this way. A 27 MHz system clock is reproduced in the case of MPEG-2. The transport stream packet processing by the system decoder 16 is output to the decoder 17 where decoding into MPEG-2 data is performed.

Two streams referred to as the program stream and the transport stream are present in the MPEG-2 system layer. The program stream is available for systems without errors such as storage media. The transport stream is available for systems having errors such as communications. The time stamp in the program stream is referred to as the SCR (system clock reference) and is sent in periods within at least 0.7 seconds. The SCR time stamp is incorporated into the program stream packet and is only present in packets for transmitting the SCR. The time stamp in the transport packet stream is a PCR and is sent in periods within at least 0.1 seconds. The PCR time stamp is incorporated into the transport stream packet to send the PCR.

The PCR is a total of 42 bits comprised of a 9-bit program clock reference extension, and a 33-bit program clock reference base. The program clock reference extension counts from 0 to 299, and the program clock reference base is incremented by one bit on the program clock extension carrier. The MPEG-2 system clock operates at 27 MHz so that a 24-hour portion of time is counted as a 27 MHz clock unit on this 42-bit counter. The PCR in other words, is a PCR counter value (PCR value) counted by the system clock.

Three documents relating to this invention are listed below.

(1) M. Perkins and P. Skelly, "A Hardware MPEG Clock Recovery Experiment in the Presence of ATM Jitter", ATM Forum contribution to the SAA sub-workinggroup, 94-0434, May, 1994.

(2) G. Franceschini, "Extension of the Adaptive Clock Method to Variable Bit Rate Streams", ATM Forum contribution to the SAA sub-working group, 94-0231, May, 1994.

(3) ISO/1EC13818-1(MPEG-2 Systems", "GENERIC CODING OF MOVING PICTURES AND ASSOCIATED AUDIO", Recommendation H.222.0, ISO/IEC JTC/SC29/G11NO721 rev, June 1984.

The above document (1) discloses hardware for achieving synchronization with the system clock of the information generator source, based on data simulating the jitter occurring on the ATM. The above document (2) discloses methods for synchronization relating to variable bit rates but does not discuss how to reduce delay distortion. The above document (3) is a draft of international standards relating to MPEG-2 system.

However, when the time stamp added by the encoder sent from the information generator source arrives at precisely the same period at the decoder, the decoder can easily synchronize with the encoder system clock by using the above disclosed methods. However, these methods assume as a necessary precondition that there is a fixed delay along the transmission path. The contents of the above document (3) in fact mention a fixed delay on the transmit path. Therefore, the following problems occur when a random delay such as on a network or namely, delay distortion is added, and there is also no means for rewriting the time stamp value to cope with a corresponding amount of delay distortion.

The time stamp value input to the PLL (Phase Locked Loop) frequency demodulator (hereafter called PLL) on the decoder side, has been added with the delay distortion, and the information source generator and decoder clock frequency differential. The PLL low-pass filter is designed to absorb the delay distortion however when the delay distortion cannot be adequately absorbed when large. Further problems are that long time is required for synchronizing when alleviating delay distortion in a PLL and the PLL circuit itself requires a complex design. A method not dependent on the decoder PLL is therefore required in order to absorb the delay distortion.

One example of this problem is when using an MPEG-2 transport stream on an ATM network. Since transmit from a plurality of nodes to a unidirectional node is performed by ATM switching per the statistical multiplexing characteristic of ATM, the cell is made to wait in the buffer. A delay is consequently generated and a random delay distortion is added to the ATM cell.

In this case, the ATM network performs switching based on the ATM header without being aware of the contents of the payload so that the timestamp is not rewritten. Therefore, the problem occurs that even if the ATM cell is assembled in the MPEG-2 system layer packet, the previously existing distortion delay is still propagated.

To resolve this problem, a buffer was installed on the receive side to absorb the distortion delay to some extent, per the VOD standards of the ATM forum, and the clock pulse was reproduced by a decoder PLL. A method referred to as the adaptive clock method is recommended.

Though this method was simple, since there was no control of synchronized data, a drawback was that jitter could not be completely eliminated in the network 14. The PLL response can be delayed in order to decode MPEG transport streams containing this jitter, however merely performing analog shaping of the jitter constituents will still allow jitter constituents to remain when viewed over a long time period.

A jitter for instance of 1 ms to 2 ms can only be reduced by approximately 40 $\mu$s. Therefore, decoding an MPEG transport stream containing jitter, recording it on a VTR and viewing the image on a monitor presents no significant problem. However, when attempting to retransmit an MPEG transport stream sent over an ATM network, to a local station or a distant station, the jitter value cannot be limited to within MPEG standards and this jitter causes great damage on the ATM network. This method in other words, is not capable of achieving a jitter value within ±500 ns, to constitute an allowable PCR value representing quality on a station quality level.

Also, when the encoder 11 encodes at a variable rate rather than a fixed rate, if the decoder does not know that the transmit rate has changed, then circuits to reduce delay distortion cannot function correctly so that the applicants proposed communication devices in Japanese Patent Application No. Hei 6-276324 and Japanese Patent Application No. Hei 7-78572 to store data indicating the packet arrival period in the packet, and based on this data, to correctly operate circuits to reduce the delay distortion.

Data indicating the packet arrival period, or for eliminating such jitter is a data amount from 1 to 8 bytes. However, the amount of data capable of being stored in the header of the transport stream packet is only up to one byte. Data in excess of one byte must be stored in a specially designated transport stream packet whose essential packet format has been altered.

SUMMARY OF THE INVENTION

This invention, in view of the circumstances of the related art, has the object of sending or receiving information for control exceeding one byte.

A communications device according to one aspect of the present invention, for transmitting data to a receiver by way of a network is characterized in having a conversion means for converting a first format data to a second format data comprised of control information inserted into the header or the trailer for controlling the operation of the receiver and, a transmission means to transmit the second format data to the receiver.

The transmission means according to the aspect of the present invention can split up the second format data into a plurality of packets and transmits the plurality of packets.

The control information can consist of synchronizing information utilized to control synchronization in the receiver.

The first format data is time based data containing time information for each specified timing, and the conversion means generates the synchronizing information based on the time information, and can insert the synchronizing information into the second format data as the control information.

The control information can be utilized as information for conveying the transmit rate.

According to another aspect of the present invention, a communications method is characterized by comprising a conversion step to convert a first format data to a second format data comprised of control information inserted into the header or the trailer for controlling the operation of the receiver and, a transmission step to transmit the second format data to the receiver.

According to another aspect of the present invention, a program of a record medium is characterized by comprising a conversion step to convert a first format data to a second format data comprised of control information inserted into the header or the trailer for controlling the operation of the receiver and, a transmission step to transmit the second format data to the receiver.

According to another aspect of the present invention, a communications device is characterized by comprising a receive means to receive from the network a first format data containing a header or a trailer, a conversion means to convert the first format data to second format data, a detection means to detect control information contained in the header or the trailer and, a control means to control the conversion means based on the control information.

The receive means is capable of receiving the first format data split up into a plurality of packets.

The control information can constitute synchronizing information utilized for control of synchronization.

The first format data is time-based data containing time information for each specific timing, the control means controls the conversion means based on the synchronizing information and, the conversion means converts the first format time information.

The control information is capable of converting information utilized for conveying the transmit rate.

A communications method according to another aspect of the present invention is characterized by comprising a receive step to receive first format data containing a header or a trailer from the network, a conversion step to convert the first format data to second format data, a detection means to detect control information contained in the header or the trailer and, a control step to control the conversion step processing based on the control information.

A program for a recording medium according to another aspect of the present invention is characterized by comprising a conversion step to convert a first format data to a second format data, a detection step to detect the control information contained in said header or said trailer of said first format data, and a control step to control the processing in said conversion step based on said control information.

A communications system according to another aspect of the present invention is characterized in that said transmitter is comprised of a first conversion means to convert a first format data containing a header or trailer into a second format data input in said header or trailer with control information to control operation of said receiver and, a transmission means to transmit said second format data to said receiver, and said receiver is comprised of a receive means to receive second format data containing said trailer or said header from said network, a second conversion means to convert said second format data to said first format data, a detection means to detect control information contained in said trailer or said header and, a control means to control the operation of said second conversion means based on said control information.

A communications device according to another aspect of the present invention and a communication method according to another aspect of the present invention, are characterized in that a first format data containing a header or trailer is converted into a second formation data having a trailer or a header inserted with control information to control the receiver operation, and the second format data is sent to the receiver.

A recording medium, according to another aspect of the present invention, is characterized in that a first format data containing a header or trailer is converted into a second format data inserted in the header or trailer with control information to control the receiver operation.

A communications device according to another aspect of the present invention and a communication method according to another aspect of the present invention, are characterized in that a first format data containing a header or trailer is received from a network, the first format data is converted into a second format data, control information contained in the header or trailer is detected, and conversion is controlled based on the control information.

A recording medium according to another aspect of the present invention is characterized in that the first format data is converted into a second format data, control information contained in the header or trailer is detected, and conversion is controlled based on the control information.

A communications system according to another aspect of the present invention is characterized in that the first format data containing a header or trailer, is converted into a second format data inserted in the header or trailer with control information to control the receiver operation, the second format data is transmitted to a receiver, the second format data containing the header or trailer is received from the network, the second format data is converted to a first format data, control information contained in the header or the trailer is detected, and the second conversion means is operated based on the control information.

BRIEF DESCRIPTION OF THE DRAWINGS

FIG. 25 is a block diagram showing the structure of the transmitter 501.

DETAILED DESCRIPTION OF THE PREFERRED EMBODIMENTS

Figure 1:
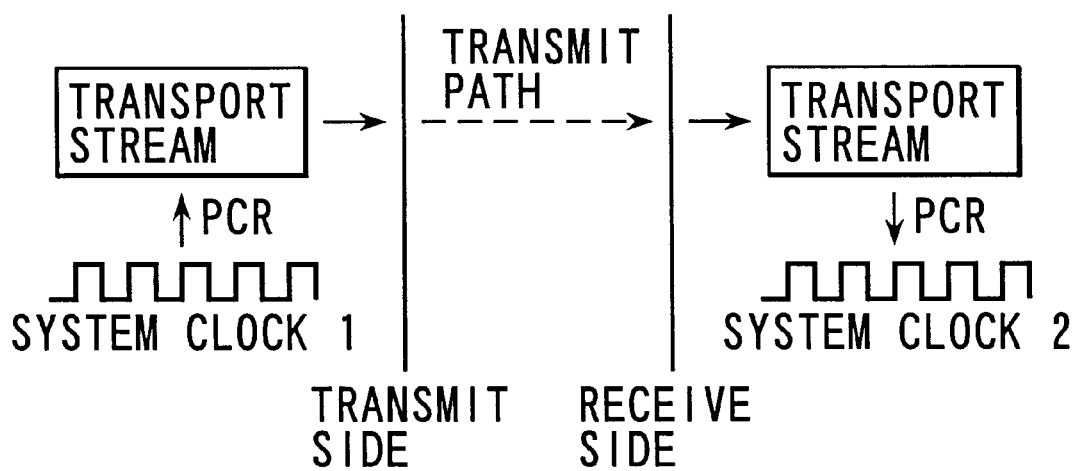
FIG. 1 is a drawing describing the concept of synchronization for the MPEG transport stream.
Figure 2:
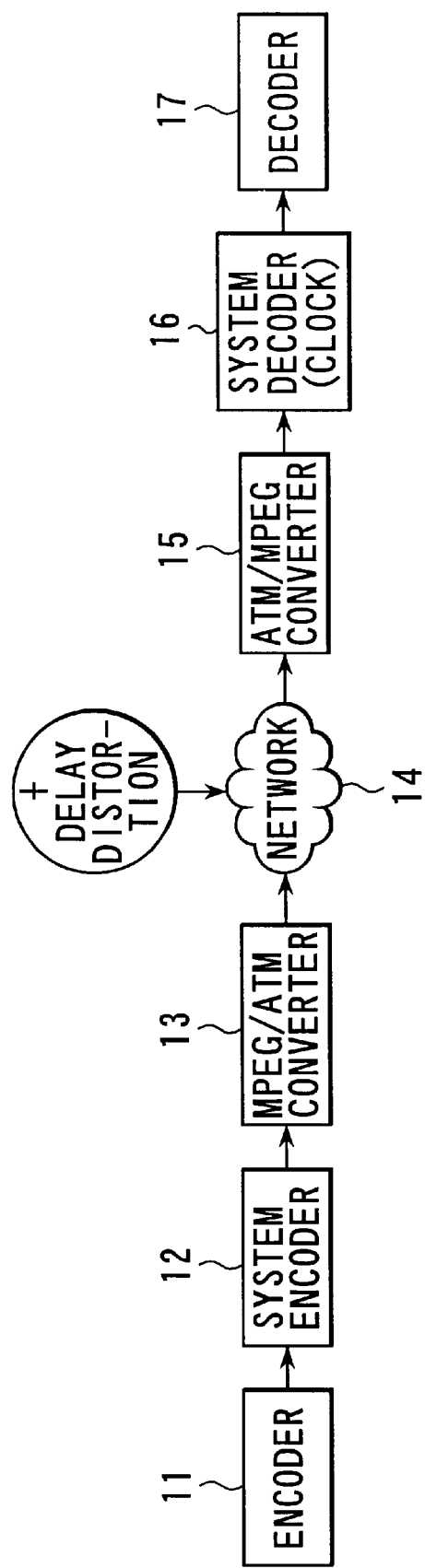
FIG. 2 is a block diagram showing the system for transmitting data comprised by MPEG-2.
Figure 3:
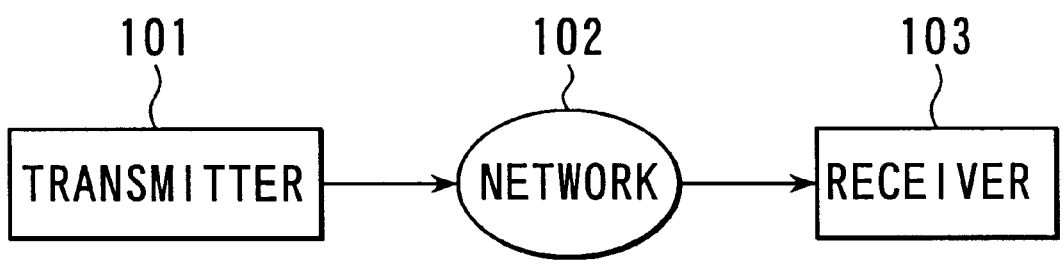
FIG. 3 is a drawing showing the structure of the embodiment of the data transmission system of the invention.

FIG. 3 is a diagram showing the structure of the embodiment of the data transmit of the invention. In this system, an MPEG transport stream conforming to the MPEG-2 standard is converted to ATM cells, and transmitted and received by way of a network 102 constituted by an ATM network. In other words, a distortion delay is generated in the data transmitted over the network 102.

In the transmitter 101, a plurality of multiplexed MPEG transport streams are input to the respective encoded programs (for instance visual or audio data for one media program). The MPEG transport stream contains a PCR packet so that the PCR will arrive at the receiver 103 within at least a period within 0.1 second at each program.

The MPEG transport stream packet (including PCR packet) input to the transmitter 101 is converted into an ATM cell (described later on while referring to FIG. 5) in the transmitter 101, and transmitted over the network 102. Synchronizing information (described later on) made based on that PCR value is stored in the header of that PCR packet.

The ATM cell transmitted over the network 102, arrives at the receiver 103, and is there converted to an MPEG transport stream packet, and the PCR value contained in the PCR packet is rewritten based on the synchronizing information stored in the PCR packet header. The MPEG transport stream packet containing the PCR packet with a rewritten PCR value, is supplied to a decoder not shown in the drawing and decoded.

Figure 4:
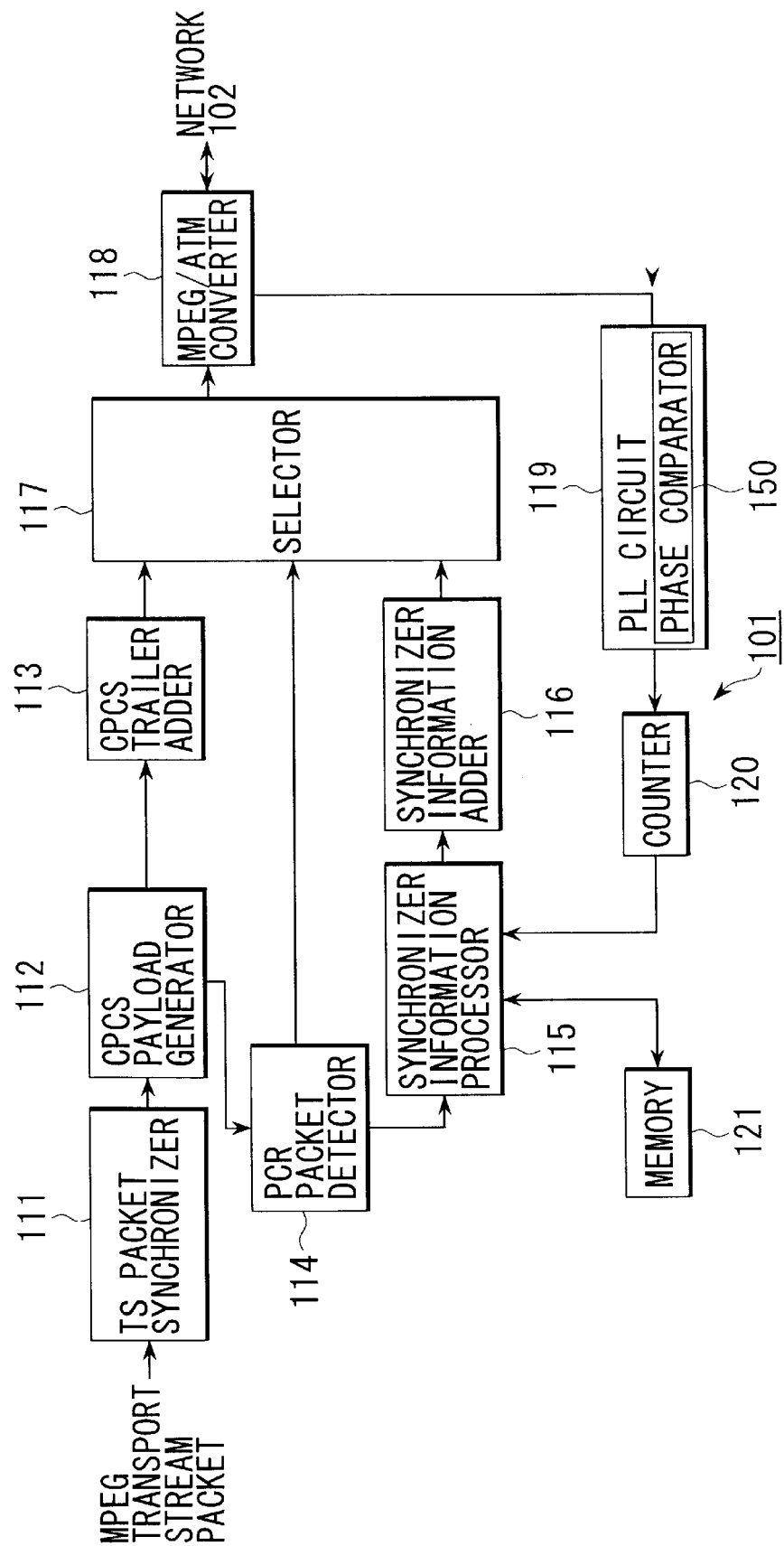
FIG. 4 is a block diagram showing the structure of the transmitter 101.

FIG. 4 is a block diagram showing the structure of the transmitter 101. The MPEG transport stream packet supplied to the transmitter 101 is input to the MPEG transport stream packet synchronizer (hereafter referred to as TS packet synchronizer). The TS packet synchronizer 111 detects the synchronizing byte (storing 47h) of the MPEG transport stream packet header so that the boundary of the MPEG transport stream packet is detected and establishes frame synchronization with the MPEG transport stream packet. A detailed description of the frame synchronization process of the TS packet synchronizer 11 is given later on while referring to the flowchart of FIG. 12.

The TS packet synchronizer 111 establishes frame synchronization with the header period of the MPEG transport stream packet, and this frame-synchronized MPEG transport stream packet is output to the payload generator 112 of the CPCS (common part convergence sublayer). To perform mapping in the ALL (ATM Adaptation Layer) 5, the CPCS payload generator 112 generates a CPCS payload based on the two MPEG transport stream packets supplied from the TS packet synchronizer 111, and supplies the CPCS payload to the CPCS trailer adder 113 and PCR packet detector 114.

The CPCS trailer adder 113 adds a CPCS trailer defined in the CS of AAL5 to the CPCS payload supplied from the CPCS payload generator 112 and outputs it to a selector 117.

Figure 5:
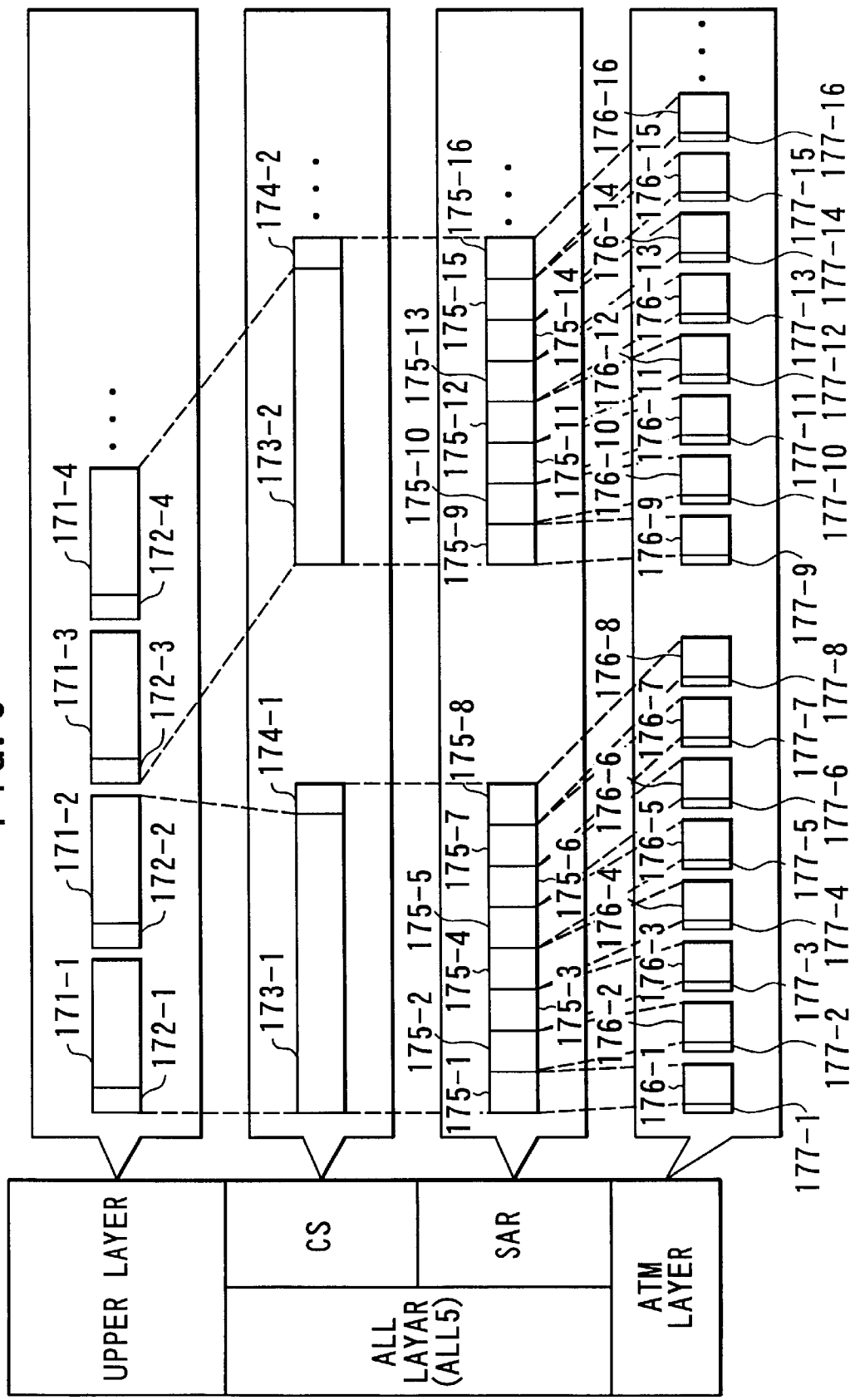
FIG. 5 is a drawing illustrating the mapping onto ALL5 of the MPEG transport stream packet.

FIG. 5 is a drawing illustrating the mapping to the MPEG transport stream packet ALL5. The MPEG transport stream packet 171-1 is comprised of a 184-byte transport stream payload (split-up and generated from a packetized elementary stream), and a 4-byte transport stream header 172-1. In the same way, each of the MPEG transport stream packets 171-2 through 171-4 are comprised a 184-byte transport stream payload (split-up and generated from a packetized elementary stream), and any of the 4-byte transport stream headers 172-2 through 172-4.

When separately identifying the MPEG transport stream packets 171-2 through 171-4 is not necessary, just the name MPEG transport stream packets 171 is used. Hereafter, the transport stream headers 172-2 through 172-4 are simply called transport stream header 172 when individual identification is not required.

Figure 6:
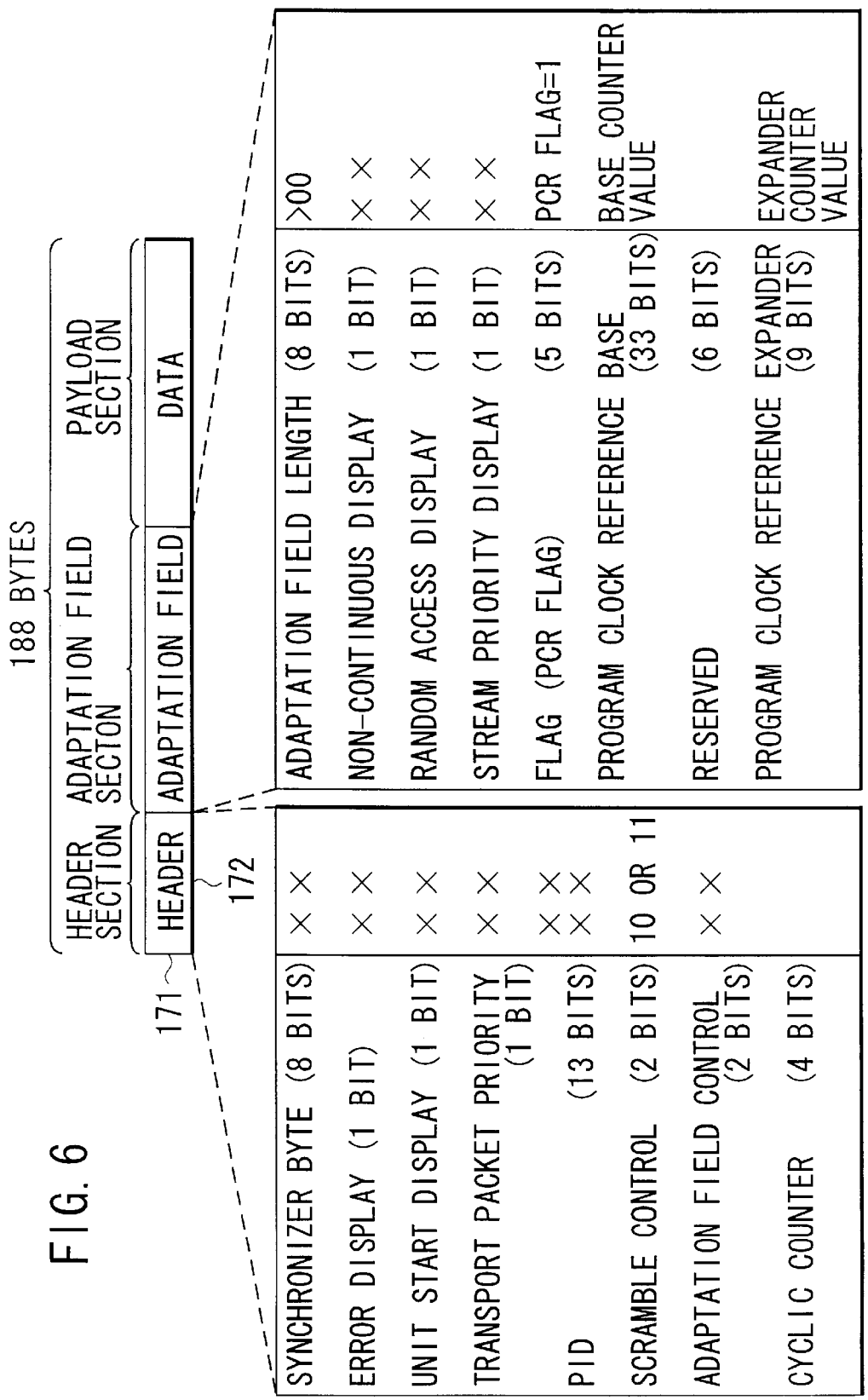
FIG. 6 is a drawing illustrating the MPEG transport stream packet 171.

The MPEG transport stream packet 171 as shown in more detail in FIG. 6, is a 188 byte fixed packet consisting of a transport stream header 172, adaptation field section and a payload. The transport stream header 172 contains a synchronizing byte (8 bits), error display (1 bit), unit start display (1 bit), transport stream packet priority (1 bit), PID (packet identification) (13 bits), scramble control (2 bits), adaptation field control (2 bytes), cyclic counter (4 bits). The synchronizing bit for the MPEG transport stream packet 171 is 47h.

The adaptation field section contains an adaptation field length (8 bits), non-continuous display (1 bit), random access display (1 bit), stream priority display (1 bit), flag (5 bits), program clock reference based (33 bits), reserve (6 bits) and program clock reference expander (9 bits). The flags consist of five types (total 5 bit portion) including a (PCR flag) (1 bit)

The payload section contains MPEG data.

Though the MPEG transport stream packet 171 has the data structure described above, as shown in FIG. 6, the adaptation field control of the transport stream header 172 is set as "10" or "11". Further, when the adaptation field length of the adaptation field section is a value other than 00h, and a "1" is set in the PCR flag (Hereafter, these kind of data settings are listed as PCR packet conditions), that MPEG transport stream packet 171 is the PCR packet, and the PCR value is expressed by the combination of the value for the program clock reference base of that adaptation field, and the value for the program clock reference expansion.

In the program clock reference base, a value from 0 through 299 is set (counted) in sequence in each PCR packet, and the program clock reference expander value increments by 1 when the value for the program clock reference base returns from 299 to 0. In other words, the program clock reference base and the program clock reference expander together total 42 bits so that in the MPEG-2 method, a 24-hour portion of time is counted in 27 MHz system clock units.

In the AAL5, the MPEG transport stream packet 171 is utilized so that padding data does not have to be added to the CPCS-PDU (protocol data unit). In this case, an integer multiple of the byte count of the MPEG transport stream packet 171 must equal a value obtained by subtracting 8 (byte count of CPCS trailer described later on) from the integer multiple of the ATM cell byte count described later on.

In the AMS VOD Specification 1.1 for the ATM forum, the storing of two MPEG transport stream packets 171 in the CPCS-PDU is regarded as a default. In other words, the CPCS-PDU 173-1 consists of two MPEG transport stream packets 171 (for instance, MPEG transport stream packet 171-1 and MPEG transport stream packet 171-2) constituted by a 376 byte CPCS payload and an 8-byte trailer 174-1. The CPCS-PDU 173-2 constituted by a 376 byte CPCS payload and is comprised of two MPEG transport stream packets 171 (for instance, MPEG transport stream packet 171-3 and MPEG transport stream packet 171-4), and an 8-byte trailer 174-2.

The CPCS-PDU 173-1 through 173-2 are hereafter referred to simply as CPCS-PDU 173 when there is no need for separate identification as CPCS-PDU 173-1 or CPCS-PDU 173-2. The trailers 174-1 or 174-2 are hereafter referred to simply as trailer 174 when there is no need for separate identification.

Figure 7:
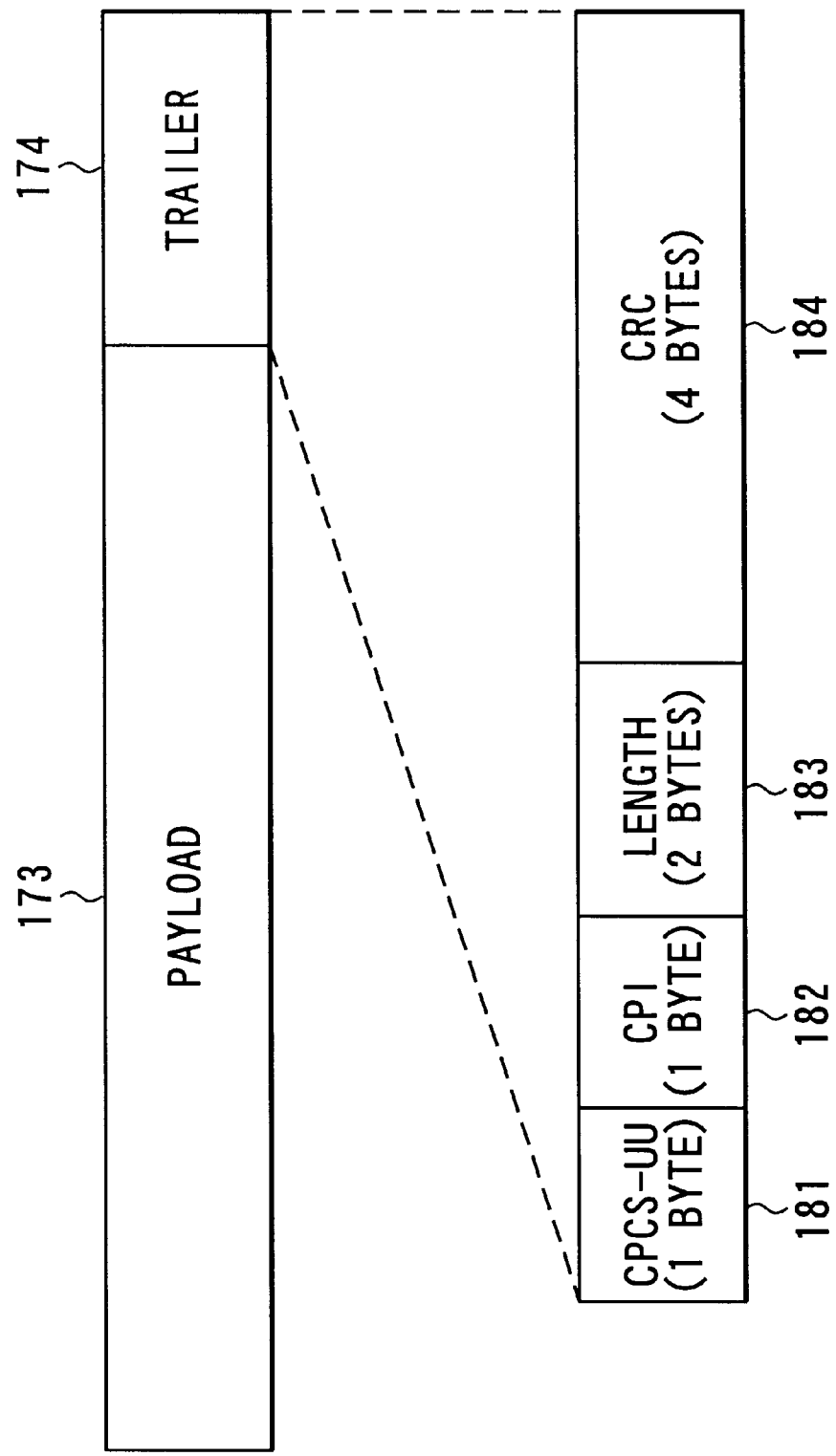
FIG. 7 is a drawing illustrating the trailer 174 of CPCS-PDU173.

The trailer 174 for the CPCS-PDU is attached to the rear of the payload of CPCS173 as shown in more detail in FIG. 7, and is comprised of a 1 byte CPCS-UU (User-to-User identification) 181, a 1 byte CPI (common part indicator) 182, a 2 byte payload length 183, and a 4 byte CRC (cyclic redundancy check) 184.

The CPCS-UU181 is information transmitted between the CPCS users. The CPI182 is shared type display. One function of the CPI182 shared type display is aligning the trailer 174 of CPCS-PDU173 to 64 bits. Other functions of the CPI182 are not determined as yet.

The payload length 183 indicates the byte count of the CPCS-PDU payload. Based on the default in the AMS VOD Specification 1.1 in the ATM forum, two MPEG transport stream packets 171 are usually stored in the CPCS-PDU173 as the CPCS-PDU payload, so the payload length 183 will always have identical values.

The CRC184 is utilized in overall bit error correction in the CPCS-PDU173. As described in the error data distribution option in the appended material E of JT-1363.5, when an error is detected in transmission of MPEG data by the CRC, the data containing the error is not discarded and is sent to the MPEG decoder for output as a satisfactory image. The MPEG decoder more specifically, possesses an error concealment function for hiding the error. Therefore, a CPCS-PDU173 payload detected as having errors, is also supplied to the MPEG decoder.

The CPCS-PDU173-1 is split up into eight SAR-PDU (48 bytes) of for example, SAR-PDU175-1 through 175-8 by SAR (segmentation and reassembly). The CPCS-PDU173-2 is in the same way split up into eight SAR-PDU175-9 through 175-16 in SAR. Hereafter, the SAR-PDU175-1 through 175-16 are referred to simply as SAR-PDU175 when there is no need for separate identification.

The ATM cells 175-1 through 175-16 are referred to simply as SAR-PDU 175 when there is no need for separate identification.

The SAR-PDU 175 is converted in the ATM layer, to a 53 byte ATM cell 176 attached with a 5 byte ATM header 177. The ATM cells 176-1 through 176-16 as shown in the example in FIG. 5, are respectively added to the SAR-PDU175-1 through 175-16, and the ATM headers 177-1 through 177-16 added.

The ATM cells 176-1 through 176-16 are referred to simply as ATM cell 176 when there is no need for separate identification.

In the receiver 103, MPEG transport stream packets are generated from the ATM cell 176 in the reverse of the above procedure.

Returning to FIG. 4, the PCR packet detector 114 refers to the adaptation table and the transport stream header 172 contained in the CPCS payload of the MPEG transport stream packet 171 and verifies whether or not PCR packet conditions have been set. When the PCR packet detector 114 verifies that PCR packet conditions have been set in the in the CPCS payload containing the MPEG transport stream packet 171, or in other words when the CPCS payload containing the MPEG transport stream packet 171 has a PCR packet, a signal indicating that information (hereafter called PCR packet detection signal PD) is output to a synchronizing information processor 115 and a selector 117.

The PCR packet detector 114 outputs the contents of that data in the CPCS payload that was input without changes, and outputs that data as is to the synchronizing information processor 115.

The CPCS payload from the PCR packet detector 114, and the count (value) from the counter 120 are respectively input to the synchronizing information processor 115, and the PCR packet detection signal PD is input from the PCR packet detector 114. The details of the processing are described later on but the synchronizing information processor 115 reads out the PCR from the PCR packet contained in the CPCS payload designated by the packet detection signal PD that was input, calculates the synchronizing information (detailed description is given later), and outputs the information to the synchronizing information adder 116. The synchronizing information processor 115 calculates the synchronizing information, and stores the offset value Oe, distance Le, and residual differential Re in a memory 121. The memory 121 stores the offset value Oe, distance Le, and residual differential Re in each program.

The synchronizing information processor 115 makes no changes to the contents of the data of the CPCS payload that was input to the synchronizing information processor 115 itself, and outputs the data unchanged to the synchronizing information adder 116.

The synchronizing information adder 116 attaches a trailer containing synchronizing information (described later on) to the CPCS payload, based on the synchronizing information supplied from the synchronizing information processor 115, generates a CPCS-PDU173, and outputs that CPCS-PDU to the selector 117.

Figure 8:
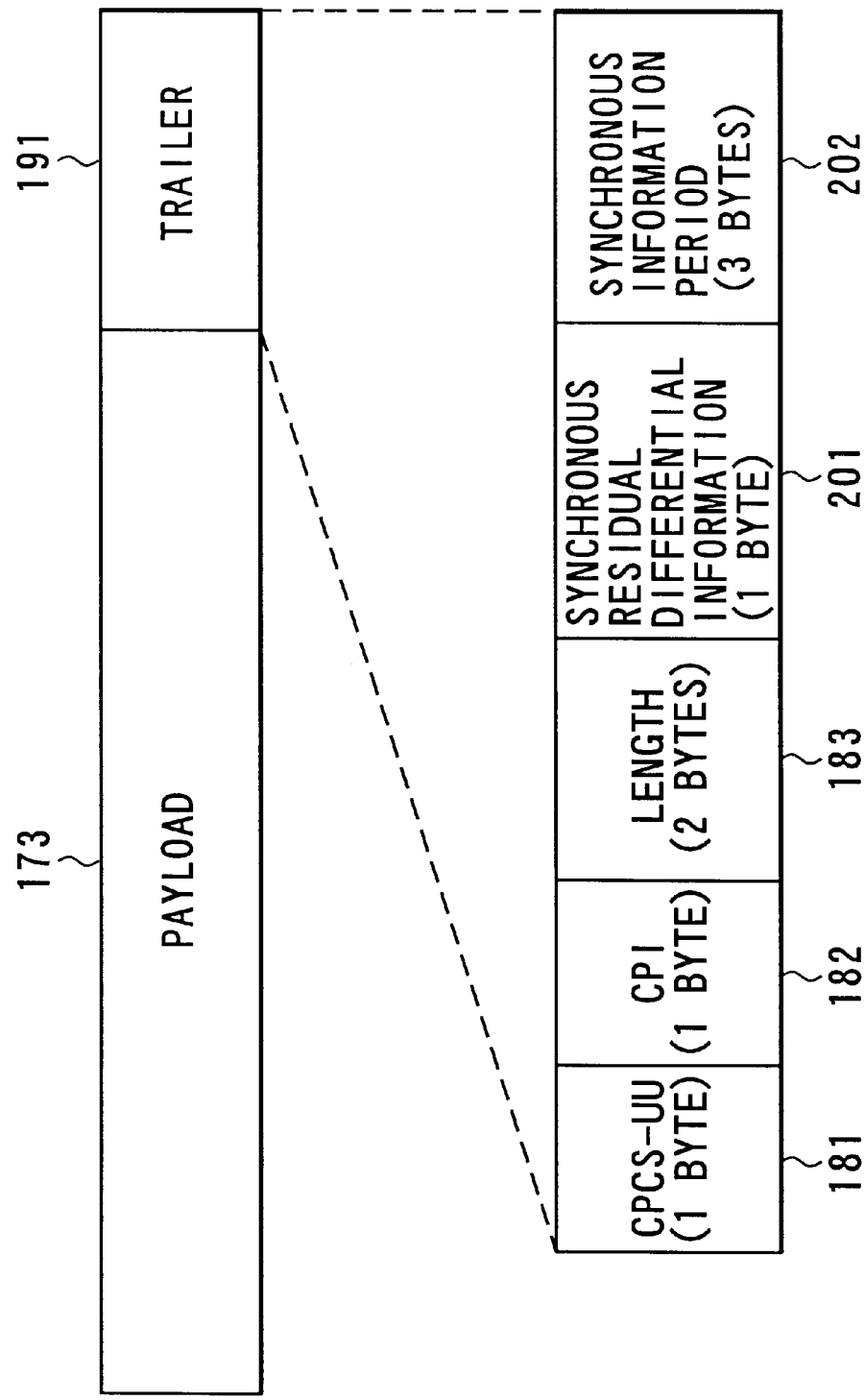
FIG. 8 is a drawing showing the trailer 191 added to the CPCS payload by the synchronizing information adder 116.

A drawing illustrating the trailer 191 attached to the CPCS payload by the synchronizing information adder 116 is shown in FIG. 8. The CPCS-UU181, CPI182, and payload length 183 of the trailer 191 are identical to trailer 174 so an explanation is omitted here.

The trailer 191 contains a one-byte synchronous residual differential information 201 and a three-byte synchronous information period 202 instead of the CRC184.

The synchronous residual differential information 201 and the synchronous information period 202 are described later on while referring to the flowchart of FIG. 13.

When the MPEG transport stream packet 171 containing the CPCS payload is not a PCR packet, based on the PCR packet detection signal PD input from the PCR packet detector 114, the selector 117 outputs a CPCS-PDU173 supplied from the CPCS trailer adder 113 to the MPEG/ATM converter 118. However, when the MPEG transport stream packet 171 containing the CPCS payload is a PCR packet, the CPCS-PDU173 (attached with synchronizing information) supplied from the synchronizing information adder 116 is output to the MPEG/ATM converter 118.

The MPEG/ATM converter 118 converts the CPCS-PDU173 supplied from the selector 117 to ATM cells 176 and outputs the ATM cells 176 to the network 102. The MPEG/ATM converter 118 still receives the ATM cells 176 sent sequentially over the network, generates an 8 kilohertz clock synchronized with the network 102 based on the received ATM cell 176, and outputs it to a PLL circuit 119.

Figure 9:
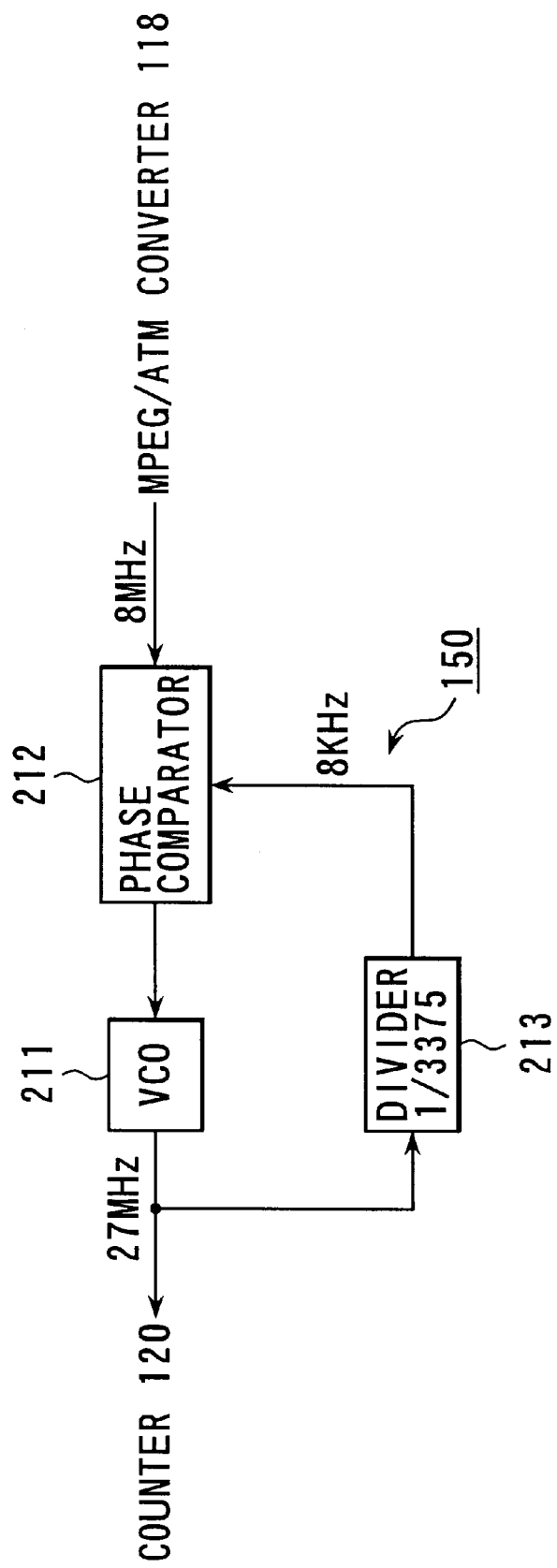
FIG. 9 is a drawing showing the structure of the phase comparator 150.

The PLL circuit 119 has a phase comparator 150 such as shown in FIG. 9. A VCO211 generates a 27 MHz clock pulse based on comparison results supplied from the phase comparator 211 and besides output to a counter 120 also sends the output to a divider 213. The divider 213 divides the 27 MHz clock pulses input from the VCO211 by 1/3375th and generates an 8 KHz clock, and outputs the clock to the phase comparator 212. The phase comparator 212, compares the phase of the 8 KHz clock pulse from the MPEG/ATM converter with the phase of the 8 KHz clock pulse from the divider 213 and outputs the comparison results to the VCO211.

Returning once again to FIG. 4, the counter counts the 27 MHz clock pulses from the PLL circuit 119 and outputs that count value Ne (described later on) to the synchronizing processor 115. In other words, the counter 120 counts the 27 MHz clock pulses synchronized with the network 102. The counter 120 counts from 0 to 4,398,046,511,104 and resets when 4,398,046,511,104 is exceeded.

Figure 10:
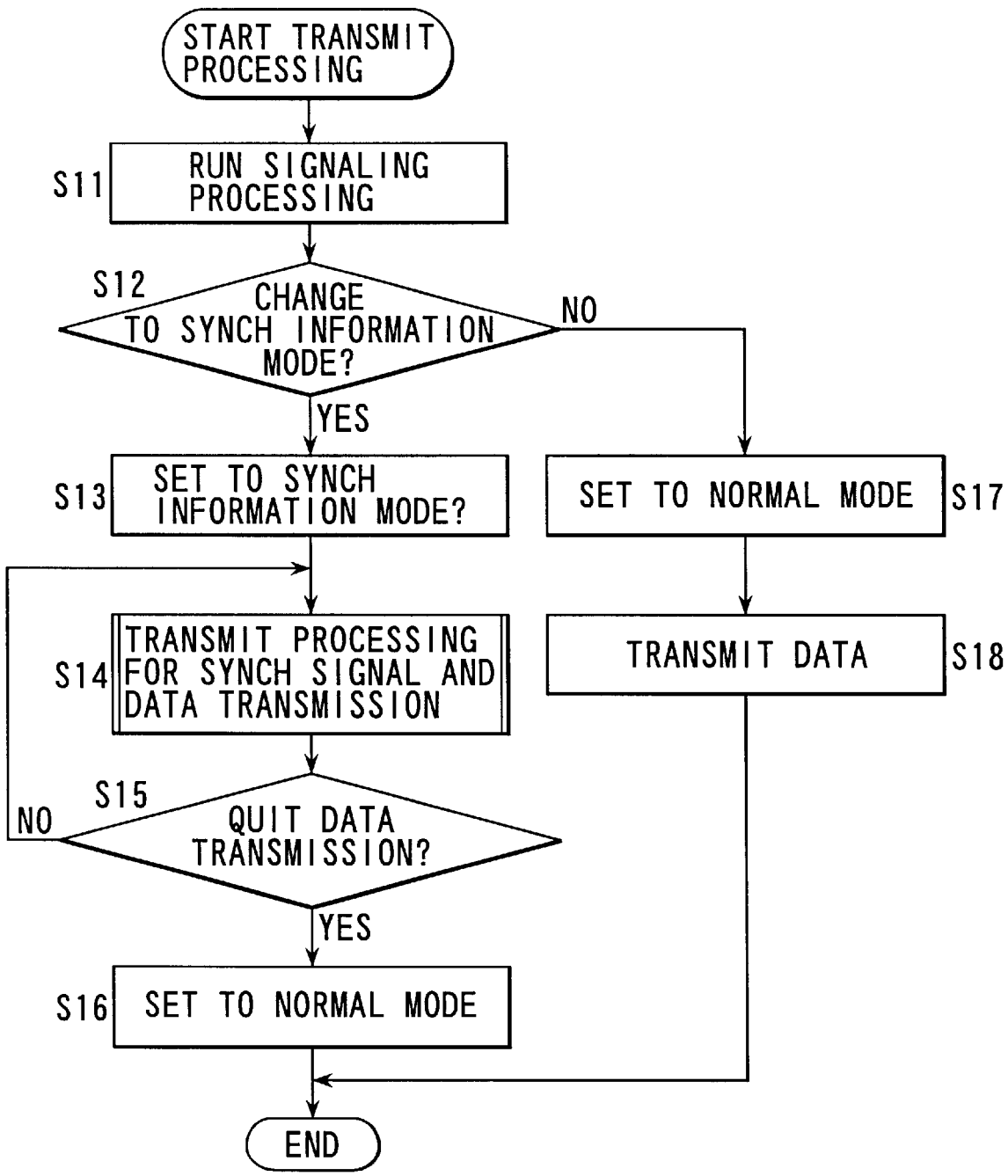
FIG. 10 is a flowchart showing the transmit processing of the transmitter 101.

The transmit processing of the transmitter 101 is next described while referring to the flowchart of FIG. 10. In step S11, the transmitter 101 implements end-to-end signal processing with the receiver 103 based on the procedure defined in the control brain and in addition to determining the relation with the virtual channel identifier, transmits to the receiver 103 whether or not to store and transmit the synchronizing information to the AAL5 trailer.

The transmitter 101 and the receiver 103 decide beforehand on an identifier to show what kind of information was stored in the AAL5 trailer as signaling information. For instance, when storing CRC184 instead of the synchronizing information, a "1" is assigned to the information element sent as signaling. To express changes in the transmit rate described later on, when changing to CRC184 and storing the arrival period, a "2" is assigned to the information element sent by signaling.

Before transmitting data, the transmitter 101 can inform the receiver 103 by means of the signaling process of step S11, if any information relating to the CPCS-PDU trailer is stored in the receiver 103.

In step S12, the transmitter 101 determines from the type of data transmitted (for instance, an MPEG transport stream packet or specified technical calculation data) whether or not to set to synchronous information mode and, when decided to set to synchronous information mode, the operation proceeds to step S13 to set the synchronous information mode.

In step S14, the transmitter 101 sends the synchronous information and data. The process of step S14 is described in detail later on while referring to the flowchart of FIG. 11.

In step S15, the transmitter 101 decides whether or not to quit transmitting data depending on whether unsent data still remains. When the transmitter 101 decides not to quit transmitting of data, the operation returns to step S14 and the process for transmitting synchronizing information and data is repeated.

When determined in step S15 to quit the transmitting of data, the operation proceeds to step S16, and the transmitter 101 sets the operation mode to normal mode as the default setting and the processing is ended. Step S16 may be omitted.

When determined in step S12 not to set to synchronous information mode, the operation proceeds to step S17, and the transmitter 101 sets the operation mode to normal mode.

In step S18, the transmitter 101 transmits the data in normal mode utilizing only the CPCS-PDU173 shown in FIG. 7 and the process ends.

In this way, the transmitter 101 can inform the receiver 103 before transmitting the data, of whether any of the information is stored in the trailer.

The transmitter 101 and the receiver 103 without signaling processing, may set beforehand what kind of information is stored in the trailer of CS-PDU173 and commence processing.

Figure 11:
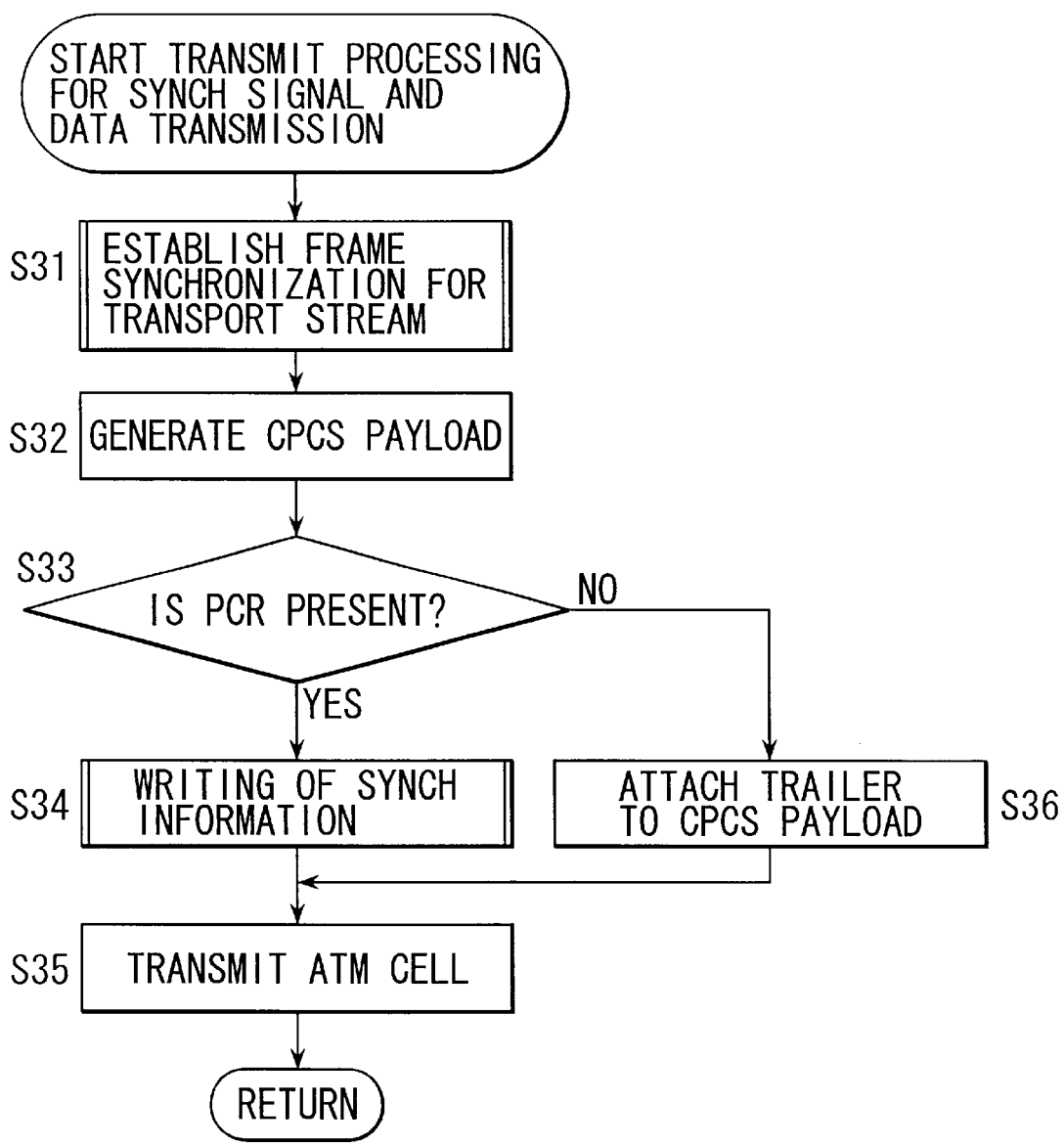
FIG. 11 is a flowchart illustrating the process for transmitting data and synchronizing information.

Next, the processing for transmitting the synchronizing information and data of the transmitter 101 for step S14 of FIG. 10 is described while referring to the flowchart of FIG. 11. In step S31, the TS packet synchronizer 111 establishes frame synchronization for the MPEG transport stream input to the transmitter 101.

In step S32, the CPCS payload generator 112 generates a CPCS payload from the two MPEG transport stream packets 171 (synchronization is established) supplied from the TS packet synchronizer 111.

In step S33, the PCR packet detector 114 decides if a PCR is present in either of the two MPEG transport stream packets 171 contained in the CPCS payload generated by the CPCS payload generator 112. When determined that a PCR is present in either of the two MPEG transport stream packets 171 contained in the CPCS payload, the operation proceeds to step S34. The synchronizing information processor 115 instep S34 generates synchronizing information, and the synchronizing information generated by the synchronizing information processor 115 is stored in the trailer 119 by the synchronizing information adder 116, and the CPCS-PDU173 is generated and output to the selector 117. The selector 117 supplies the CPCS-PDU173 supplied from the synchronizing information adder 116 to the MPEG/ATM converter 118, and proceeds to step S35.

Figure 13:
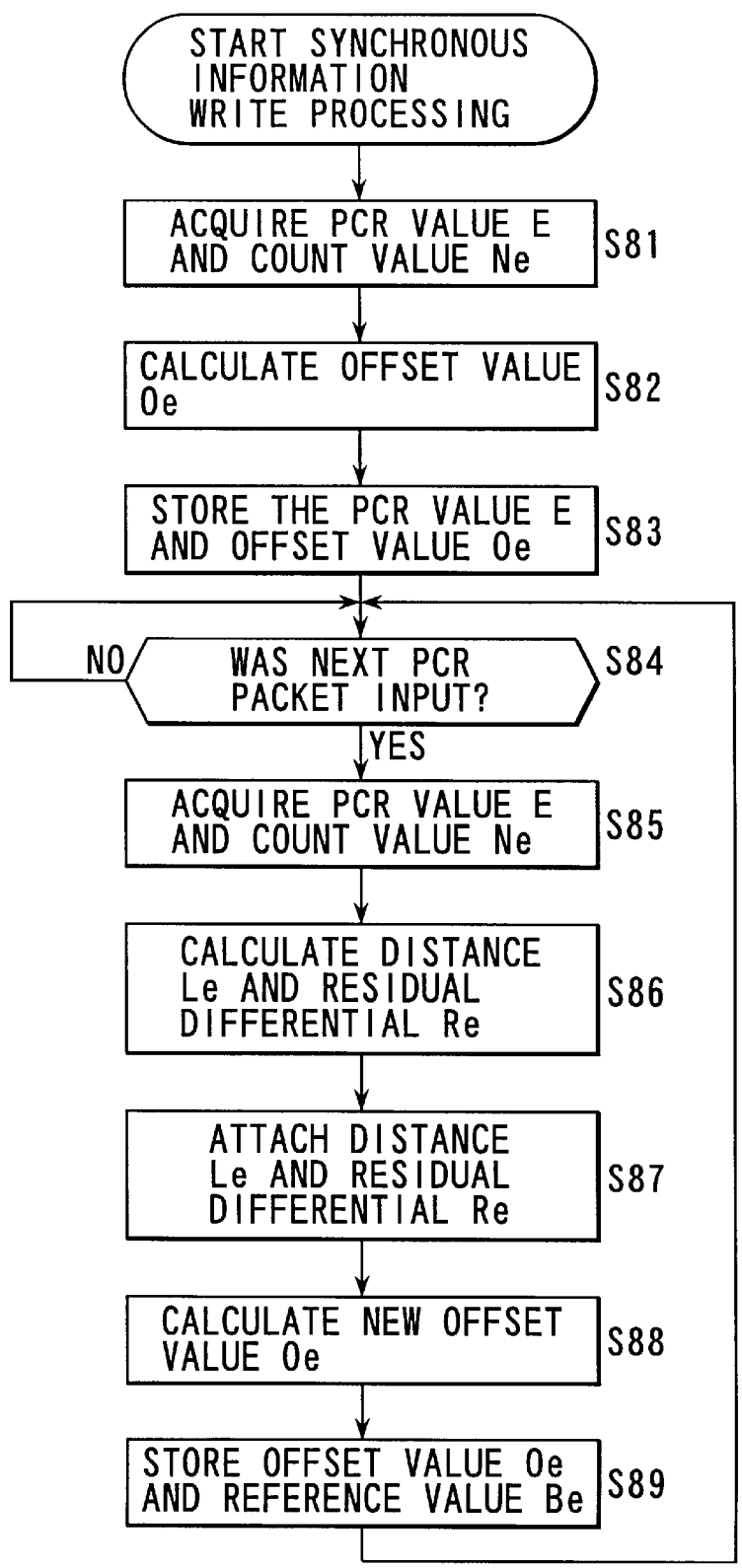
FIG. 13 is a flowchart illustrating the process for writing the transmitter 101 synchronizing information.

The process of step S34 for writing synchronizing information is described in detail while referring to FIG. 13.

When determined in step S33 that a PCR is not present in the MPEG transport stream packets 171 contained in the CPCS payload, the operation proceeds to step S36 where the CPCS trailer adder 113 adds the trailer 174 to the CPCS payload supplied from the CPCS payload generator 112 and sends the output to the selector 117. The selector 117 supplies the CPCS-PDU173 supplied from the CPCS trailer adder 113 to the MPEG/ATM converter 118.

In step S35, the MPEG/ATM converter 118 generates an ATM cell 176 based on the CPCS-PDU173 supplied from the selector 117, transmits it over the network 102 and the process is ended.

The transmitter 101 can therefore store synchronizing information in the trailer of the CPCS-PDU173 contained in the MPEG transport stream packet having a PCR and functioning as the CPCS payload, and can transmit it to the receiver 103.

Figure 12:
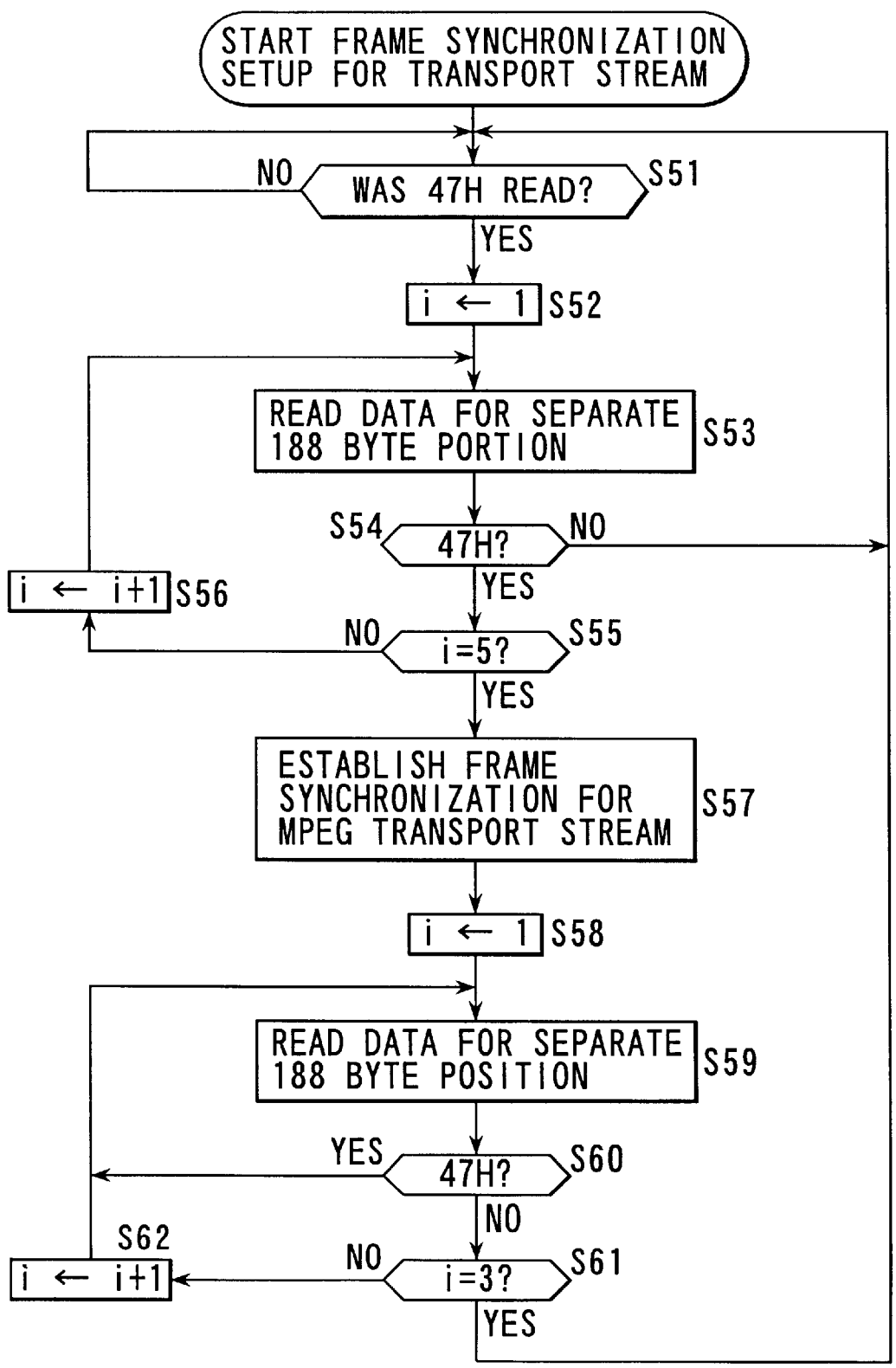
FIG. 12 is a flowchart illustrating the process for establishing frame synchronization of the transport stream of the transmitter 101.

The process corresponding to step S31 of FIG. 11, for establishing frame synchronization of the transport stream of the transmitter 101 is next described while referring to the flowchart of FIG. 12. In step S51, the TS packet synchronizer 111 reads out each one byte data value of the MPEG transport stream that was input, and the read-out value is made to stand-by for 47h (value set in the synchronizing byte of the MPEG transport stream packet 171) and at readout of 47h, the operation proceeds to step S52 and the counter i value is initialized to 1. Next, in step S53, the TS packet synchronizer 111 reads out the 188 byte rear portion of data from the data read-out in step S51 per 47h, and in step S54 a decision is made whether that value is 47h or not. In other words, since the MPEG transport stream packet 171 is a fixed packet of 188 bytes, if the one byte of data read-out in step S51 per 47h is a synchronizing byte, then the portion of data behind the 188 bytes is also a synchronizing byte and 47h has been set.

When determined in step S54 that the read-out data is not 47h, the TS packet synchronizer 111 returns to step S51. However, in step S54 when determined that the read-out data is 47h, then the TS packet synchronizer 11 proceeds to step S55.

In step S55, the TS packet synchronizer 111 decides whether or not the value of counter i is equal to 5. When not equal to 5, the TS packet synchronizer 111 proceeds to step S56 and the counter i value is incremented by one and the operation returns to step S53 and the processing from that step on wards is repeated. When determined in step S55 that the value of counter i is equal to 5, in other words, when 47h was continuously read out 5 times in each 188 bytes from the data of the MPEG transport stream packet that was input, then the operation proceeds to step S57.

In step S57, the position at which the TS packet synchronizer 111 detected the fifth 47h, is the beginning of the MPEG transport stream packet 171, and frame synchronization with this MPEG transport stream packet 171 is established.

The TS packet synchronizer 111 establishes frame synchronization with the MPEG transport stream packet so that the MPEG transport stream packet 171 prior to establishing frame synchronization is not supplied to the CPCS payload generator 112 and is discarded. Next, in step S58, the TS packet synchronizer 111, resets or initializes the value of counter i to 1 and proceeds to step S59, reads out data from the 188 byte portion rearward from the position of the data (47h) read out in Step S53, and in step S60 whether or not the data is 47h is determined.

When determined in step S60 that the data read out in step S59 is not 47h, the TS packet synchronizer 111 proceeds to step S61 and a decision made as to whether the value of counter i is equal to 3. When found not equal to 3, operation proceeds to step S62, the value of counter i is incremented by one, step S59 is returned to, and processes subsequent to step S59 are repeated. In step S61 on the other hand, when determined that the value of counter i is equal to 3, the TS packet synchronizer 111 returns to step S51 and processes subsequent to step S51 are executed. In other words, when determined that the data read out in step S59 was not 47h three times continuously, then frame synchronization with the MPEG transport stream packet is determined to be incorrect, the process returns to step S51 and the frame synchronization process is performed again from the beginning.

When found in this example that the data read out in the 188 byte period is not 47h three times continuously, then the frame synchronization process is performed from the beginning.

In step S70, when the TS packet synchronizer 111 determines that the data read out in step S59 is 47h, then the operation returns to step S59 and processes subsequent to step S59 are executed.

Next, the processing of step S34 of FIG. 11 for writing transmitter 101 synchronizing information is described while referring to the flowchart of FIG. 13.

When frame synchronization with the MPEG transport stream packet has been established by the TS packet synchronizer 111, then, after frame synchronization, when the PCR packet detector 114 detects the PCR packet 1 of the MPEG transport stream packet 171 containing the first PCR, the PCR packet detection signal is then input to the synchronizing information processor 115. The synchronizing information processor 115 therefore, in step S81 reads out PCR value E1 of the PCR packet 1 specified by the PCR packet detection signal PD, and holds the count value Ne1 supplied at that time from the counter 120.

Next, in step S82, the synchronizing information processor 115 substitutes the count value Ne1 and the PCR value E1 obtained in step S81 into Equation (1) and calculates the offset value Oe.

$$\text{Offset value } Oe = PCR \text{ value } E1 - \text{count value } Ne1 \quad (1)$$

In step S83, the synchronizing information processor 115 stores the PCR value E1 read out in step S81, and the offset value Oe calculated in step S82, into the memory 121. Next, instep S84, the synchronizing information processor 115 waits until the next PCR packet (Second PCR packet 2 in this case) is input, and detects the PCR packet 2 by means of the PCR packet detector 114, and proceeds to step S85 when the packet detection signal PD is input.

In step S85, the synchronizing information processor 115 reads (or loads) the PCR value E2 from the PCR packet designated by the PCR packet detection signal PD input in step S84, and holds the count value Ne2 input at that time from the counter 120. Next, in step S86, the synchronizing information processor 115 calculates the distance Le and residual differential Re. The method for calculating the distance Le and residual differential Re is here described while referring to FIGS. 14A, 14B and 14C. The distance Le is the so-called PCR packet arrival time, and the residual differential Re is the synchronous residual differential. Hereafter, when there is no need to distinguish the distance Le and residual differential Re from each other, both shall be referred to as synchronizing information.

Figures 14A, 14B, 14C:
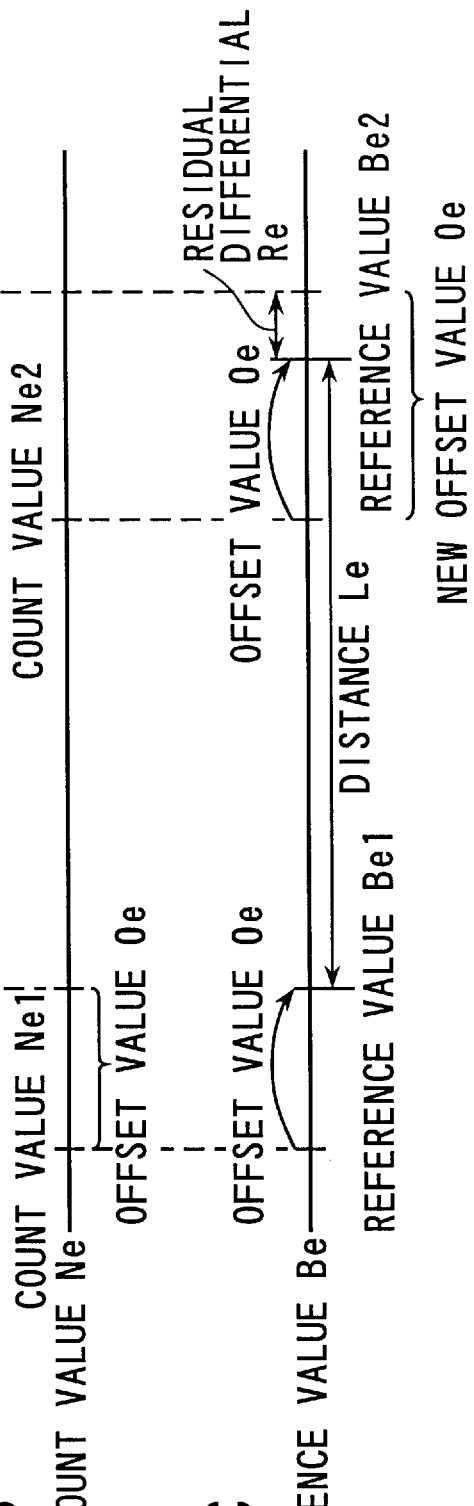
FIGS. 14A, 14B and 14C are drawings describing the process for calculating the distance Le and the remaining differential Re.

In the example here, the count value Ne1 and PCR value E1 for the PCR packet 1 acquired in step S81, the offset value Oe calculated in step S82, and also the count value Ne2 and PCR value E2 for PCR packet 2 acquired in step S85 have the positional relationship respectively shown in FIGS. 14A and 14B.

The synchronizing information processor 115 first calculates the reference value Be1 (FIG. 14C) by adding the offset value Oe to the count value Ne1 (acquired in step S81) according to Equation (2).

$$\text{Reference value } Be1 = \text{count value } Ne1 + \text{offset value } Oe \quad (2)$$

In this case, the reference value Be1 is the same value as PCR value E1.

The synchronizing information processor 115 next calculates the reference value Be2 (FIG. 14C) according to Equation (3), by adding the offset value Oe to the count value Ne2 acquired in step S85, and further calculates the distance Le (FIG. 14C) between the reference value Be2 and reference value Be1, according to Equation (4).

$$\text{Reference value } Be2 = \text{count value } Ne2 + \text{offset value } Oe \quad (3)$$

$$\text{Distance } Le = \text{Reference value } Be2 - \text{reference value } Be1 \quad (4)$$

Next, the synchronizing information processor 115 calculates according to Equation (5), the residual differential Re by subtracting the reference value Be2 from the PCR value E2 of PCR packet 2 acquired in step S85.

$$\text{Residual difference } Re = PCR \text{ value } E2 - \text{reference value } Be2 \quad (5)$$

The reference value Be2 is the estimated value for PCR value E2 of PCR packet 2, assuming a fixed delay in generating the MPEG transport stream packet input to the transmitter 101. In other words, the residual difference Re indicates the difference between the estimated value (reference value Be2) and actual PCR value (PCR value E2) when separated just by the distance Le.

When the distance Le and residual differential Re calculated in this way, are stored in the memory 121, the operation proceeds to step S87 and the synchronizing information adder 116 besides adding the CPCS-UU181, CPI182, and payload length 183 to the CPCS payload, also adds the distance Le and residual differential Re as the trailer 191 (residual difference Re is attached as synch residual differential information 201, and the distance Le is attached as the synchronous information period 202), and the CPCS-PDU is output to the selector 117. The selector 117 outputs the CPCS-PDU173 supplied from the synchronizing information adder 116 to the MPEG/ATM converter 118, based on the PCR packet detection signal PD supplied from the PCR packet detector 114.

The CPCS-PDU173 written with synchronizing information in the trailer 191 and output to the MPEG/ATM converter 118 is converted there into an ATM cell 176 and sent over the network 102. According to the MPEG-2 system standards the allowable error range of the system clock (27 MHz clock) is ±810 Hz, and the PCR is sent at a rate of once within every 0.1 seconds. The size of the residual differential Re is therefore within 81 clock pulses (=810 (Hz)×0.1 (S) and can be expressed as one byte of data (−127 to 127). Since a three-byte portion of data is required in the distance Le, the synchronizing information can be shown as a total of four bytes of data.

Instep S88, the synchronizing information processor 115 next calculates the new offset value Oe according to Equation (6), by adding the offset value Oe calculated in step S82, to the residual differential Re, and then in step S89 stores the new offset value Oe along with the reference value Be2 calculated in step S86, in the memory 121. The operation then returns to step S84, and the processing in step S85 through S89 is executed for the next CPCS payload.

$$\text{New offset value } Oe = \text{offset value } Oe + \text{residual differential } Re \quad (6)$$

Data from the above processing stored in the memory 121 is stored in each program.

The transmitter 101 as described above, can therefore store synchronizing information of 4 bytes in a trailer 191 and transmit this trailer 191.

Figure 15:
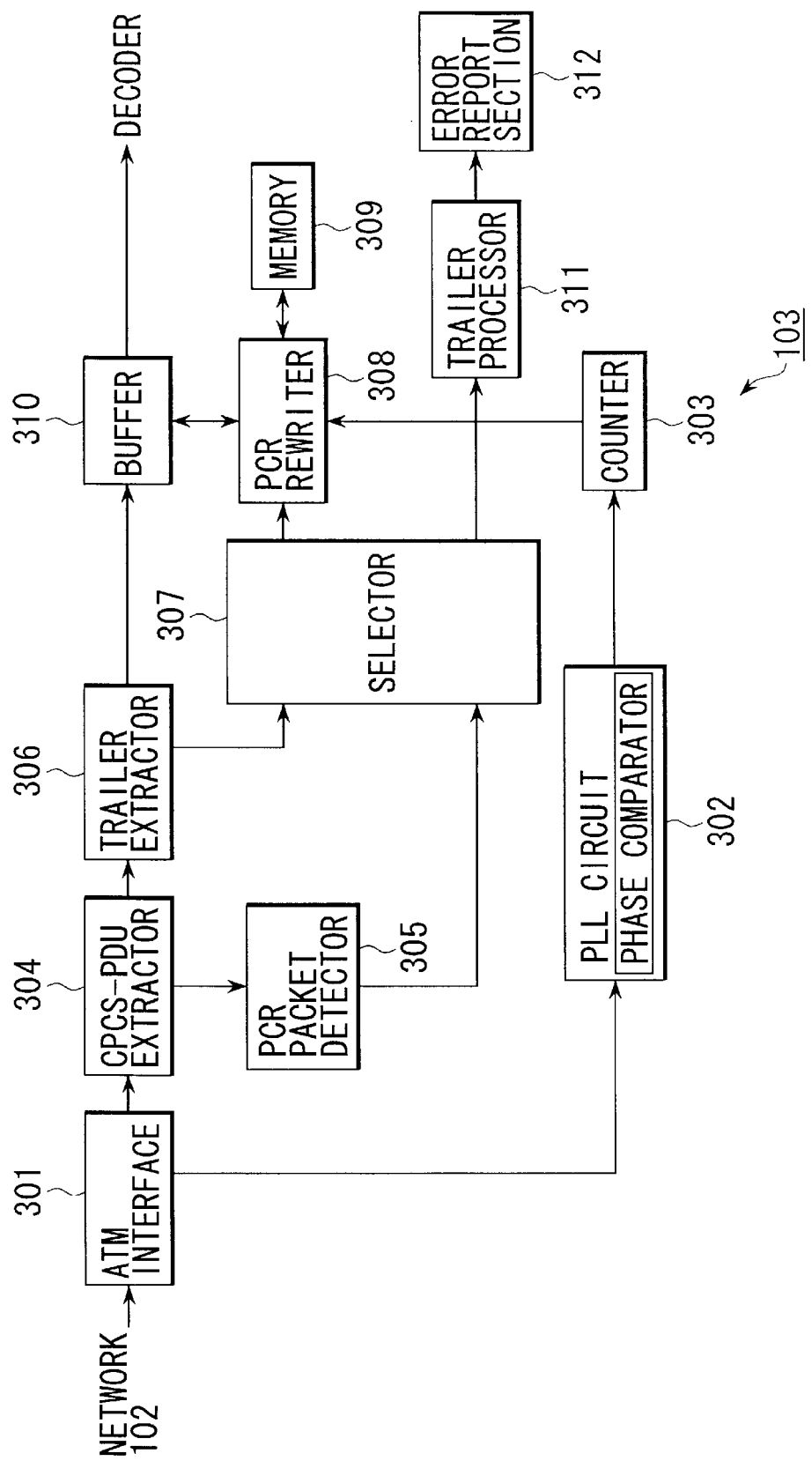
FIG. 15 is a block diagram showing the structure of the receiver 103.

The receiver 103 is described next. The structure of the receiver 103 is shown in the block diagram of FIG. 15. The ATM interface 301 receives the ATM cells 176 received from the transmitter 101 by way of the network 102, and outputs the received ATM cells 176 to the CPCS-PDU extractor 304. The ATM interface 301 also generates a synchronized 8 KHz clock based on the ATM cell 176 that was received, and outputs the clock to the PLL circuit 302. The PLL circuit 302 has a structure identical to the PLL circuit 119 of FIG. 4, and has a phase comparator having a structure identical to the phase comparator 150 shown in FIG. 9. The PLL circuit 302 reproduces the 27 MHz clock, based on the synchronized clock supplied over the network 102 from the ATM interface 301 and outputs the clock to the counter 303.

The counter 303, besides counting the 27 MHz clock pulses from the PLL circuit 302 in a range from 0 to 4,398,046,511,104, also outputs that count value Nr to the PCR rewriter 308.

The CPCS-PDU extractor 304 converts the ATM cell 176 supplied from the ATM interface 301, to the CPCS-PDU173, and outputs the CPCS-PDU173 thus obtained, to the trailer extractor 306 and the PCR packet detector 305.

The PCR detector 305 checks whether or not a 1has been set in the PCR flag of the adaptation field of the two MPEG transport stream packets 171 or in other words, in the CPC Spayload of the CPCS-PDU173 that was input. When confirmed that a 1has been set in the in the PCR flag of the adaptation field of the two MPEG transport stream packets 171, a PCR packet detection signal is output to the selector 307.

The trailer extractor 306, along with supplying to the buffer 310, the CPCS payload of CPCS-PDU173 or in other words, the two MPEG transport stream packets 171, also supplies the CPCS-PDU173 trailer (trailer 174 or trailer 191) to the selector 307.

When the PCB packet detector 305 has confirmed that a 1 is set in the PCR flag of the adaptation field of the two MPEG transport stream packets 171, based on the PCR packet detection signal PD supplied from the PCR packet detector 305, the selector 307 supplies the synchronous information period 202 and the synch residual differential information 201 contained in the trailer 191 input from the trailer extractor 306, to the PCR rewriter 308. When confirmed that a 1 is not set in the PCR flag of the adaptation field of the two MPEG transport stream packets 171, the CPI182, the CPCS-UU 181 contained in the trailer 174 and trailer 191 as well as the payload length 183 are supplied to the trailer processor 311.

The PCR rewriter 308, calculates the PCR value C of the MPEG transport stream packets 171 stored in the buffer 310 based on the synchronous information period 202 and the synch residual differential information 201 supplied from the selector 307. The PCR rewriter 308 also writes (rewrites) the calculated PCR value C, into the MPEG transport stream packets 171 stored in the buffer 310. The buffer 310 outputs the MPEG transport stream packets 171 written with the PCR value C, to a decoder not shown in the drawing.

The processing in the rewriter 308 is described in detail later on while referring to the flowchart in FIG. 18. The memory 309 stores per each program, the data required for the PCR rewriter 308 to calculate the PCR value C.

Based on the CPI182, the CPCS-UU 181 contained in the trailer 174 and trailer 191 as well as the payload length 183, the trailer processor 311 executes ordinary trailer processing (in particular, error detection processing per CRC184 of trailer 174) and when an error is detected, supplies the specified data to the error report section 312. The error report section 312 notifies for instance, a specified control software or upper layer, with data showing the contents of the error input from the trailer processor 311.

Figure 16:
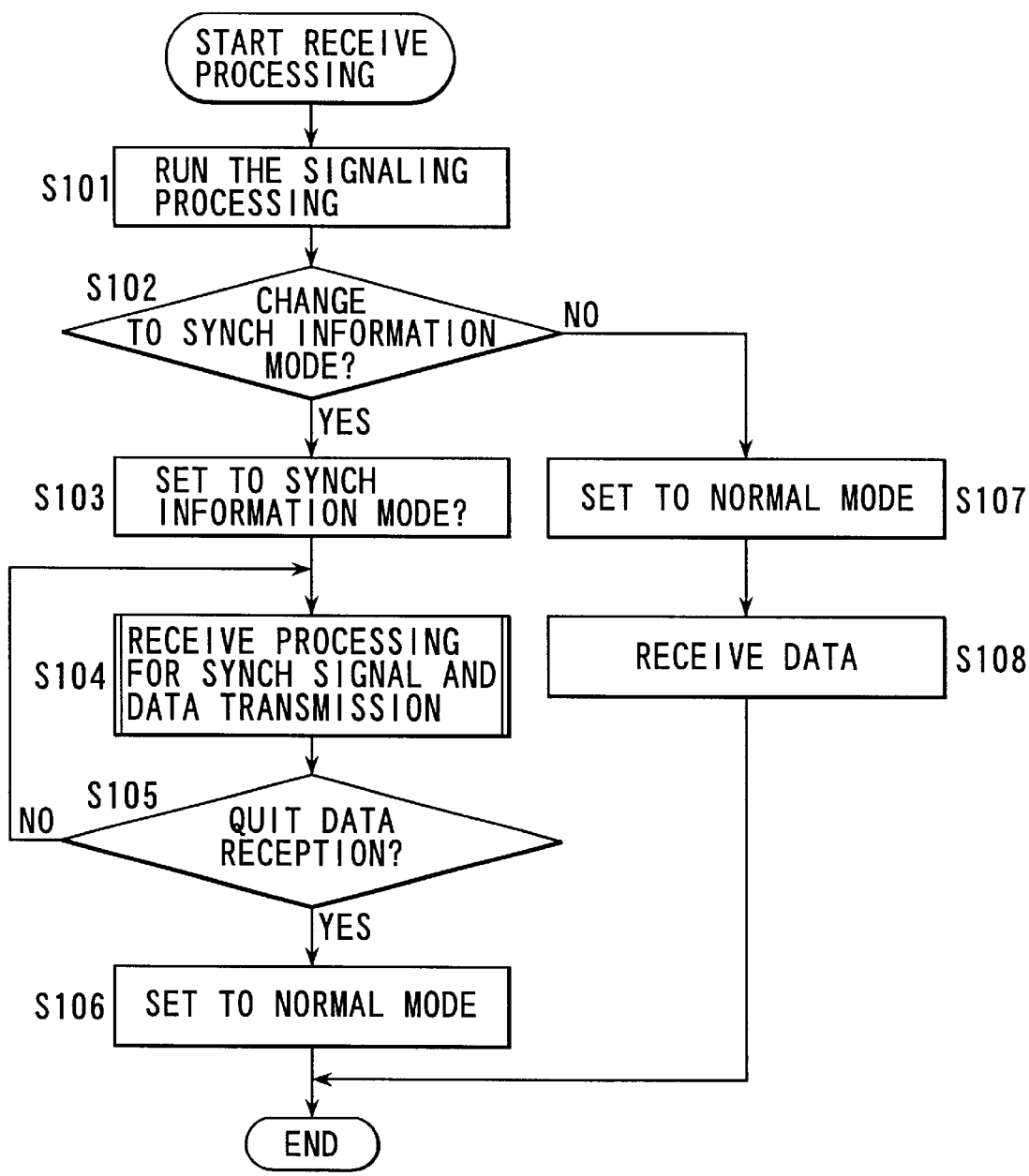
FIG. 16 is a flowchart showing the receive processing of the receiver 103.

The receive processing of the receiver 103 is next described while referring to the flowchart of FIG. 16. In step S101, the receiver 103 executes the signaling processing, and receives data as to whether or not the transmitter 101 is transmitting information stored in the trailer of AAL5.

Prior to receiving the data, the receiver 101 can determine by means of the signaling processing in step S101 whether or not the transmitter 101 has stored any of the information in the trailer.

In step S102, the receiver 103 decides whether or not to set in synchronizing information mode based on the signaling results. When the receiver 103 decides to set in synchronizing information mode, the operation proceeds to step S103 and synchronizing information mode is set.

In step S104, the receiver 103 receives the synchronizing information and data. The processing of step S104 is described later on while referring to the flowchart in FIG. 17.

In step S105, the receiver 103 decides whether or not to quit receiving data and when the receiver 103 had decided not to quit receiving data, the operation returns to step S104, and the processing to receive the synchronizing information and data is repeated.

In step S105, when the receiver 103 decides to quit receiving data, the operation proceeds to step S106 and the receiver 103 is set in normal mode constituting a default setting and the processing ends. The processing of step S106 may be omitted.

In step S102, when decided not to set in synchronizing information mode, the synchronizing information is not received so that the operation proceeds to step S107 and the receiver 103 is set in normal mode.

In step S18, the receiver 103 receives data in normal mode and quits the processing.

In this way, the receiver 103 can know before receiving the data, if any information is stored in the trailer.

Figure 17:
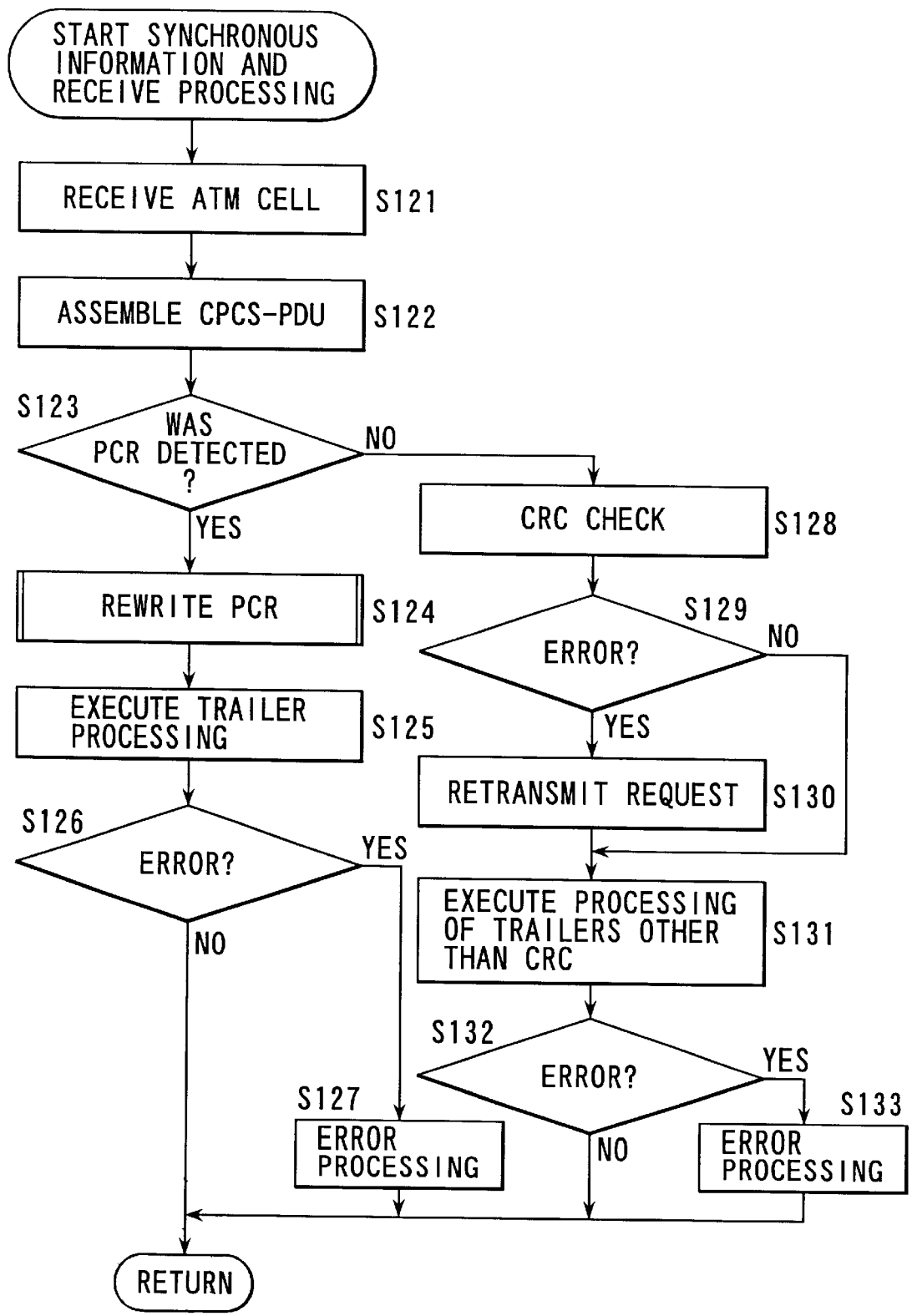
FIG. 17 is a flowchart illustrating the data receive processing and the synchronizing information of the receiver 103.

Next, the receive processing for the receiver 103 synchronizing information and data in step S104 of FIG. 16, is described while referring to the flowchart of FIG. 17. In step S121, the ATM interface 301 receives the ATM cell 176 transmitted from the transmitter 101 over the network 102.

In step S122, the CPCS-PDU extractor 304 generates the CPCS-PDU173 based on the ATM cell 176 supplied from the ATM interface 301.

In step S123, the PCR packet detector 305 decides whether or not a PCR is present in the MPEG transport stream packet 171 contained in the CPCS payload of the CPCS-PDU 173 extracted by the CPCS-PDU extractor 304. When determined that a PCR is present in the MPEG transport stream packet 171 contained in the CPCS payload, the operation proceeds to step S124, and the PCR rewriter 308, based on the synchronous information period 202 and the synch residual differential information 201 supplied from the selector 307, calculates the PCR value C of the MPEG transport stream packet 171 stored in the buffer 310. The PCR rewriter 308 writes (or rewrites) the PCR value C in the MPEG transport stream packet 171 stored in the buffer 310 and the operation proceeds to step S125.

Figure 18:
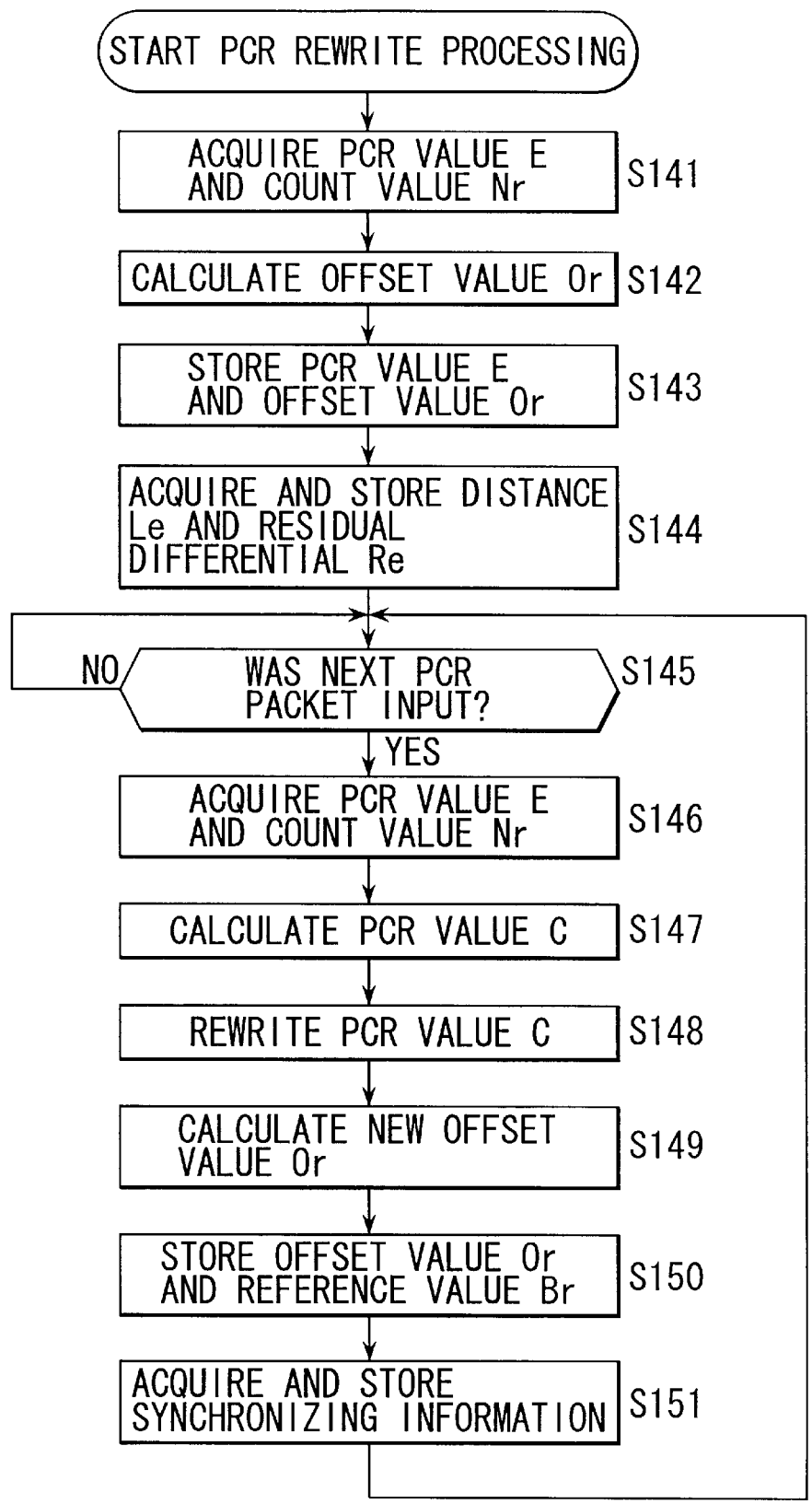
FIG. 18 is a flowchart illustrating the process for rewriting the PCR value of the receiver 103.

The processing for rewriting the synchronizing information of step S124 is described while referring to the flowchart of FIG. 18.

In step S125, the trailer processor 311 executes normal trailer processing based on the CPI 182, the CPCS-UU 181 contained in the trailer 174 and trailer 191 as well as the payload length 183. In step S126, the trailer processor 311 checks the validity of the CPI182 or the payload length 183 values, and decides whether or not an error has occurred. When determined that an error has occurred, the operation proceeds to step S127 and the error report section 312, performs error processing such as notifying the upper layer, and quits the processing.

When determined in step S126 that an error has not occurred, the processing ends.

In step S123, when determined that no PCR is present in the MPEG transport stream packet 171 contained in the CPCS payload, the operation proceeds to step S128, and the trailer processor 311 checks the CRC184 of the trailer 174 of CPCS-PDU173. In step S129, the trailer processor 311 checks the CRC184 of step S128, and decides whether or not an error has occurred. When determined that an error has occurred, the operation proceeds to step S130, and the error report section 312 requests the re-sending of the MPEG transport stream packet 171, and the process proceeds to step S131.

In step S129, when determined that an error has not occurred, step S130 is skipped, the process proceeds to step S131 and the trailer processor 311 executes trailer processing based on the CPI182, the CPCS-UU 181 or the payload length 183, excluding the CRC184 of trailer 174 of CPCS-PDU173.

In step 132, the trailer processor 311 checks the validity of the CPI182 or payload length 183 values and decides whether or not an error has occurred. When decided that an error has occurred, the operation proceeds to step S133 and the error report section 312 executes error processing such as notifying the upper layer and ends the processing.

In step 132, decided that an error has not occurred, the processing ends.

The receiver 103 as described above, can therefore rewrite the PCR utilizing the synchronizing information in the trailer (where the PCR is present) of the CPCS-PDU173 contained in the MPEG transport stream packet 171 constituting the CPCS payload.

Next, the processing procedure for step S124 of FIG. 17, of the PCR rewriter 308 when rewriting the PCR value of the PCR packet input in the receiver 103, is described while referring to the flowchart of FIG. 18. The PCR packet detector 305 detects the PCR packet 11 and when the PCR packet detection signal PD is supplied to the selector 307, the selector 307 outputs the synchronous residual differential information 201 and the synchronous information period 202 supplied from the trailer extractor 306, to the PCR rewriter 308, so that in step S141, the PCR rewriter 308 reads (loads) the PCR value E11 of the PCR packet 11 designated by the PCR packet detection signal PD, and holds the count value Nr11 supplied from the counter 303 at that time.

Next, in step S142, the PCR rewriter 308, the offset value Or is calculated by entering the count value Nr11 and the PCR value E11 obtained in step S141, into Equation (7).

$$\text{Offset value } Or = PCR \text{ value } E11 - \text{count value } Nr11 \quad (7)$$

In step S143, the PCR rewriter 308 stores the PCR value E11 read out (loaded) in step S141, and the offset value Or calculated in step S142, in the memory 309. Next, in step S144, reads out (loads) and stores in the memory 309, the synch residual information 201 supplied from the selector 307 as the residual differential Re, and also the synchronous information period 202 as the distance Le.

In step S145, the PCR rewriter 308 stands by (waits) until the next PCR packet (in this case, the second PCR packet 12) is input, and the operation proceeds to step S146 when the PCR packet 12 is detected by the PCR detector 305 and the PCR packet detection signal PD is input. In step S146, the PCR rewriter 308 reads out (loads) the PCR value E12 from the PCR packet 12 specified by the PCR packet detection signal PC input in step S145, and holds the count value Nr12 supplied from the counter 303 at that time.

Next, in step S147, the PCR rewriter 308 calculates the PCR value C to be rewritten as the PCR value E12 of the PCR packet 12. The method for calculating the PCR value C is described here while referring to FIGS. 19A, 19B and 19C.

Figure 19:
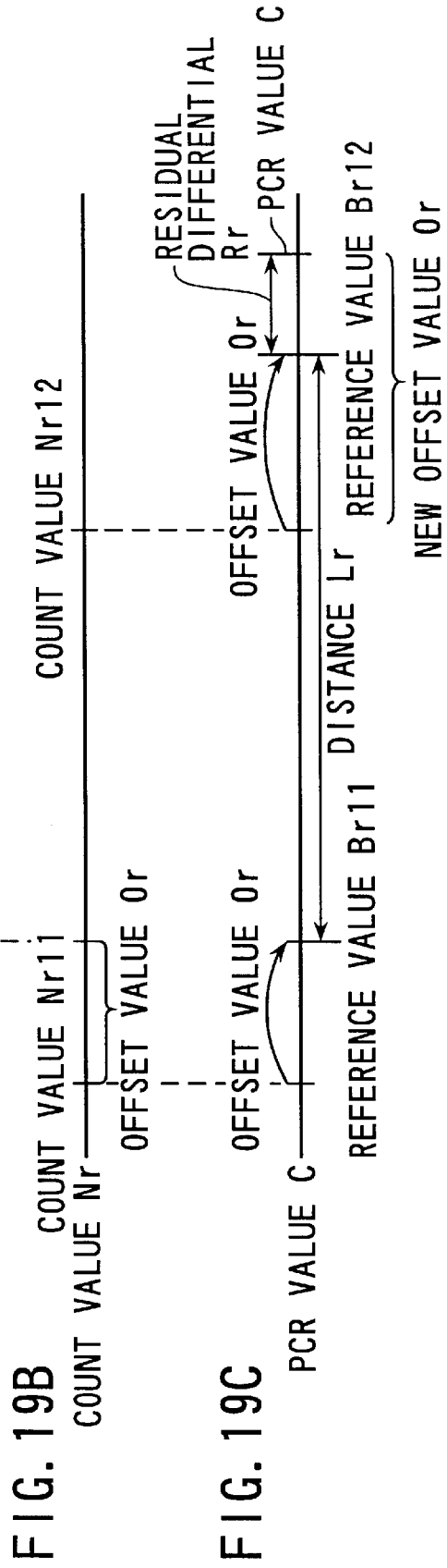
FIGS. 19A, 19B and 19C are drawings illustrating the method for calculating the PCR value C.

In the case of this example, the count value Nr11 and the PCR value E11 of the PCR packet 11 acquired in step S141, the offset value Or calculated in step S142, as well as the PCR value E12 and count value Nr12 of the PCR packet acquired in step S146, have the positional relations shown in FIG. 19A and FIG. 19B.

The PCR rewriter 308 at this point, first calculates the reference value Br11 (FIG. 19C) by adding the offset value Or to the count value Nr11 (obtained in step S141) according to Equation (8).

$$\text{Reference value } Br11 = \text{count value } Nr11 + \text{offset value } Or \quad (8)$$

In the case of this example, the reference value B11 has the same value as the PCR value E11, however the reference value B11 can also be calculated by calculating the offset value Or based on the preceding PCR value E, and adding the offset value Or to the count value Nr11 input when the PCR packet is input later on.

The PC rewriter 308 calculates the reference value Br12 (FIG. 19C) by adding the offset value Or to the count value Nr12 (obtained in step S146) according to Equation (9), and further calculates the distance Lr (FIG. 19C) between the reference value Br12 and the reference value Br11 according to Equation (10).

$$\text{Reference value } Br12 = \text{count value } Nr12 + \text{offset value } Or \quad (9)$$

$$\text{Distance } Lr = \text{reference value } Br12 - \text{reference value } Br11 \quad (10)$$

Next, the PCR rewriter 308 calculates the residual differential Re by substituting into Equation (11), the synchronizing information for distance Le and residual differential Re supplied from the selector 307 read out (loaded) in step S144 and also the previously calculated distance Lr. The PCR rewriter 308 further calculates the PCR value C by adding the reference value Br12 to the residual differential Re, according to Equation (12).

$$\text{Residual differential } Rr = \text{residual differential } Rex \text{ (distance } Lr/\text{distance } Le) \quad (11)$$

$$\text{PCR value } C = \text{reference value } Br11 + \text{distance } Lr + \text{residual differential } Rr \quad (12)$$

The reference value Br12 is the estimated value of the PCR value E12 of the PCR packet 12, when assumed that the delay generated in the ATM cell input to the receiver 103 is a fixed delay. The residual differential Rr is the estimated value when the differential of the estimated value (reference value Br12) and the PCR value (PCR value E12) when separated by distance Lr is calculated from the proportional relation of the residual differential Re and distance Le. In other words, the true PCR is estimated to be the PCR value C with a residual differential Rr added to the reference value Br12 and distance Lr. The distance Lr and residual differential Rr calculated here are stored in the memory 309.

When the PCR value C is calculated in step S147 in this way, the PCR rewriter 308 proceeds to step S148, substitutes in the PCR value E12 of PCR packet 12 and supplies the detected PCR value C to the buffer 310. The buffer 310 writes the PCR value C into the specified MPEG transport stream packet 171 and outputs that MPEG transport stream packet 171 to a decoder not shown in the drawing. Therefore, in the decoder, a clock pulse synchronized with the transmitter 101 system clock is thus reproduced, and the data decoded.

Next, in step S149, the PCR rewriter 308 calculates, according to Equation (13), the new offset value Or by adding the residual differential Rr to the offset value Or calculated in step S142, and in step S150 stores the new offset value Or along with the reference value Br12 into the memory 309.

$$\text{New offset value } Or = \text{offset value } Or + \text{residual differential } Rr \quad (13)$$

In step S151, the PCR rewriter 308 reads (loads) the synchronizing information (distance Le and residual differential Re) of the PCR packet 12 and stores it in the memory 309. Afterwards, the operation returns to step S145 and processing in steps S145 through S151 is executed on the next PCR packet.

Each type of data stored in the memory 309 in the above processing is stored in each program.

The synchronizing information (distance Le and residual differential Re) formed per the transmitter 101 in this way, is transmitted to the receiver 103. In the receiver 103 the PCR of the MPEG transport stream packet 171 is rewritten based on that synchronizing information so that the decoder procuring that PCR reproduces a system clock synchronized with clock at the time of encoding, and the data is suitably reproduced.

Also, the offset value Oe, distance Le, and residual differential Re are stored in the memory 121 per the transmitter 101, and the offset value Or, distance Le and residual differential Rr are stored in the memory 309 per the receiver 103 so as to be stored in each program so that rewriting of the PCR can be executed in a plurality of programs.

Figure 20:
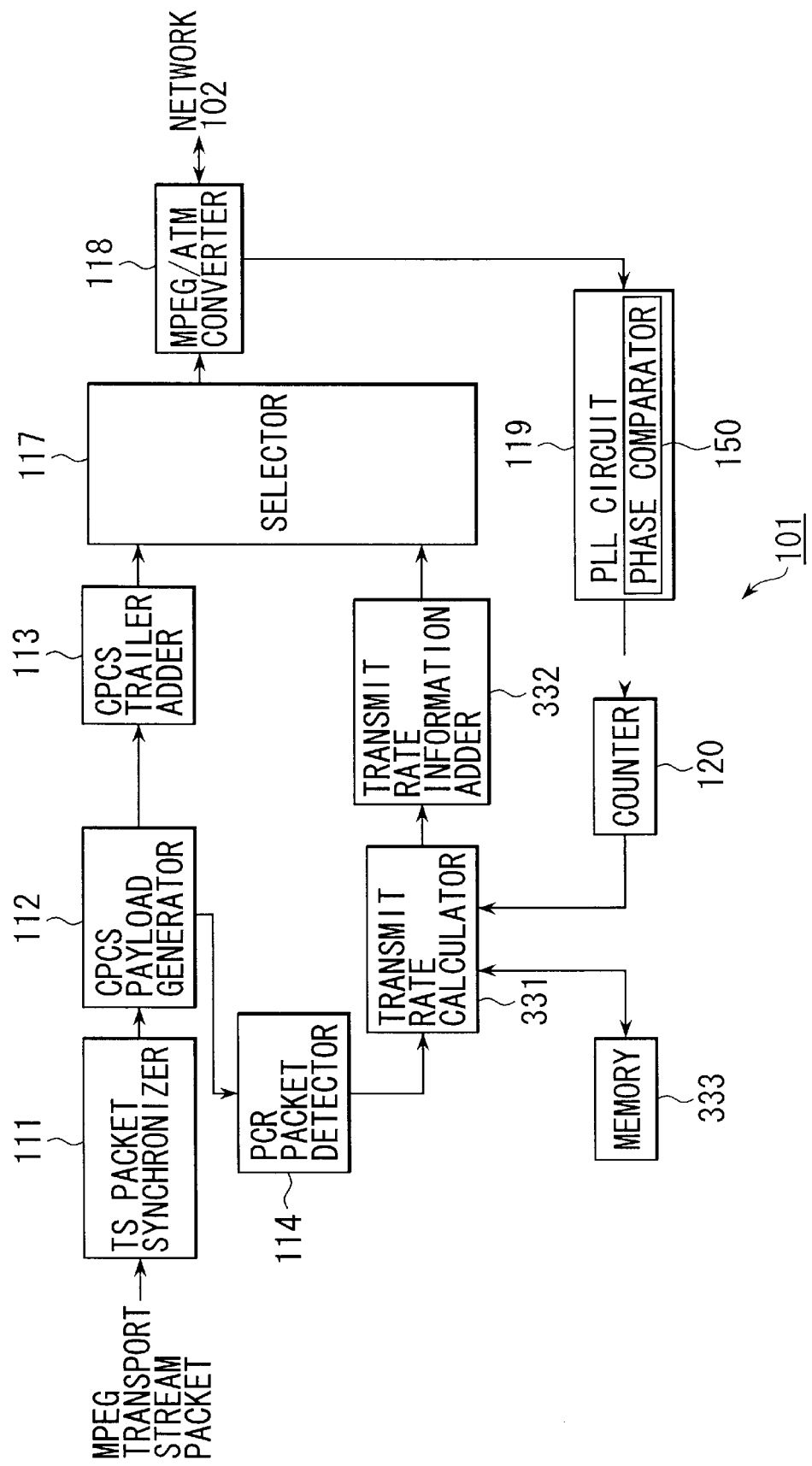
FIG. 20 is a drawing showing another structure of the transmitter 101.

A block diagram showing another structure of the transmitter 101 when changing the transmission rate is shown in FIG. 20. The TS packet synchronizer 111 through the PCR packet detector 114, and also the selector 117 and MPEG/ATM converter 118 are identical to the case of FIG. 4, so an explanation is omitted here.

Besides input of the CPCS payload from the PCR packet detector 114 and the count value from the counter 120 to the transmit rate calculator 331, a PCR packet detection signal PC from the PCR packet detection signal PD is also input to the transmit rate calculator 331. The transmit rate calculator 331 calculates the transmit rate (expressed for instance by the arrival period time of the CPCS payload) based on the arrival period time of the payload specified by the PCR packet detection signal that was input, and the number of CPCS payloads that arrived within the arrival period time of the payload specified by the PCR packet detection signal, and the transmit rate calculator 331 outputs the transmit rate to the transmit rate information adder 332.

Each time the synchronizing information is calculated, the transmit rate calculator 331 stores data such as the arrival time of the CPCS payload designated by the PCR packet detection signal PD, or the count value for the number of CPCS payloads that arrived, in the memory 333. The memory 333 stores that data in each program.

The transmit rate calculator 331 outputs unchanged, the CPCS payload that was input into it, to the transmit rate information adder 332 without performing any processing.

Based on the synchronous information supplied from the transmit rate calculator 331, the transmit rate information adder 332 attaches the transmit rate to the CPCS payload, instead of the CPCS payload specified in CS of AAL5, and outputs the CPCS-PDU173 to the selector 117.

Figure 21:
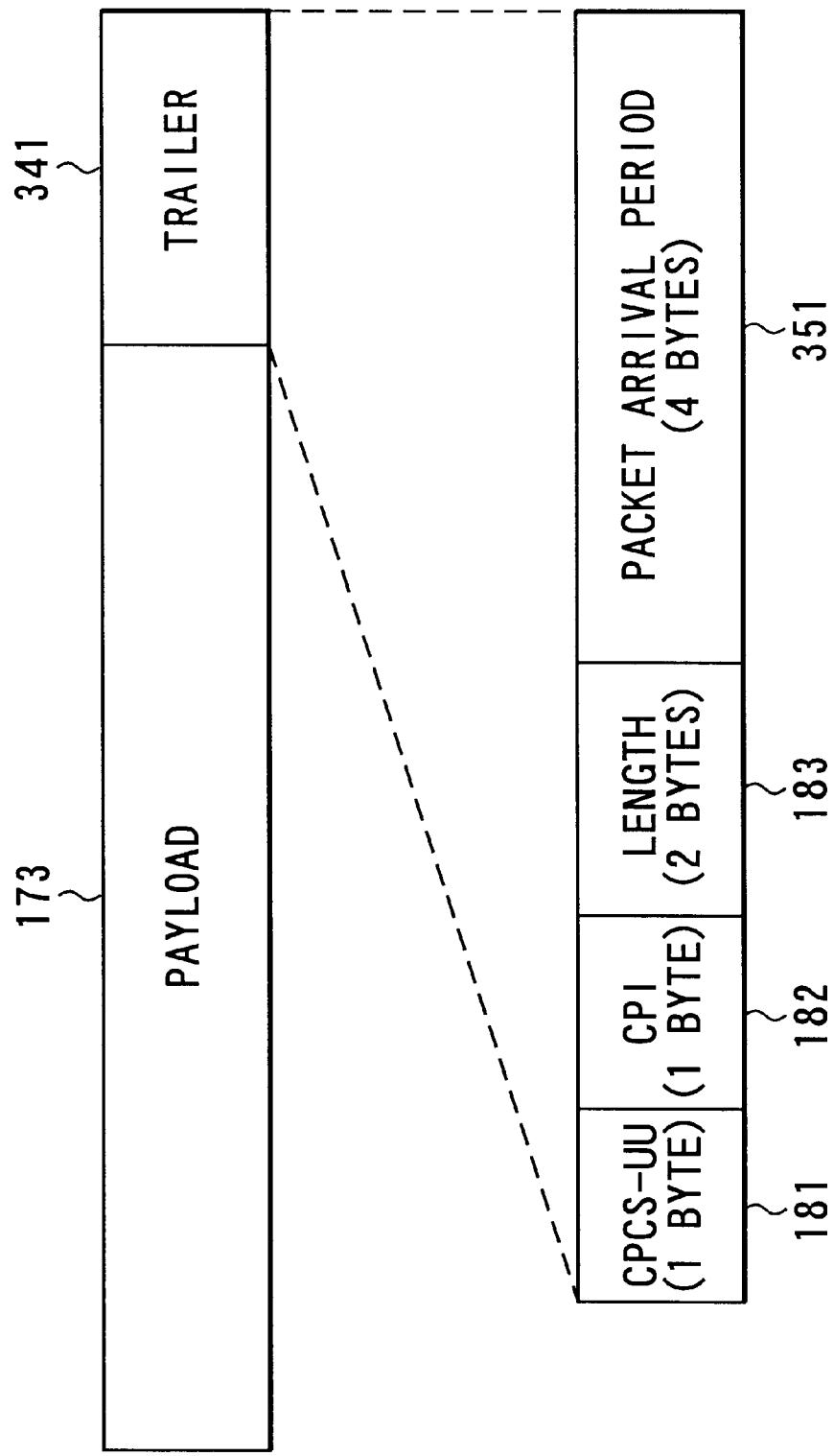
FIG. 21 is a drawing showing the trailer 341 added to the CPCS payload by the synchronizing information adder 332.

The attaching of a trailer 341 to the CPCS payload by the transmit rate information adder 332 is described using FIG. 21. The 1 byte CPCS-UU181 of trailer 341, the 1 byte CPI182, and the 2 byte payload length 183 are the same as for trailer 174 so an explanation is omitted here. The trailer 134 contains a 4 byte packet arrival period 351 instead of the CRC184.

Based on the packet detection signal PD input from the PCR packet detector 114, when there is no PCR packet in the MPEG transport stream packet 171 contained in the CPCS payload, the selector 117 outputs the CPCS-PDU173 supplied from the CPCS trailer adder 113 to the MPEG/ATM converter 118. However, when a PCR packet is present in the MPEG transport stream packet 171 contained in the CPCS payload, the CPCS-PDU173 (attached by the packet arrival period 351) supplied from the transmit rate information adder 332 is output to the MPEG/ATM converter 118.

The MPEG/ATM converter 118 converts the CPCS-PDU173 into an ATM cell 176 and transmits it over the network 102. The MPEG/ATM converter 118 also receives ATM cells transmitted in sequence over the network 102, and based on these received ATM cells, generates an 8 KHz clock synchronized with the network 102 and outputs the 8 KHz clock to the PLL circuit 119.

The transmit processing of the transmitter 101 of FIG. 20 is the same as the processing described by referring to the flowchart of FIG. 10, except for the transmission of data and synchronizing information in step S14, so an explanation is omitted here. In the transmit processing of the transmitter 101 of FIG. 20, transmission of the transmit rate and data is performed (Of course, in the signaling process, the transmitter 101 sends information for transmitting the transmit rate and data.) instead of the transmit processing of synchronizing information and data of step S14.

Figure 22:
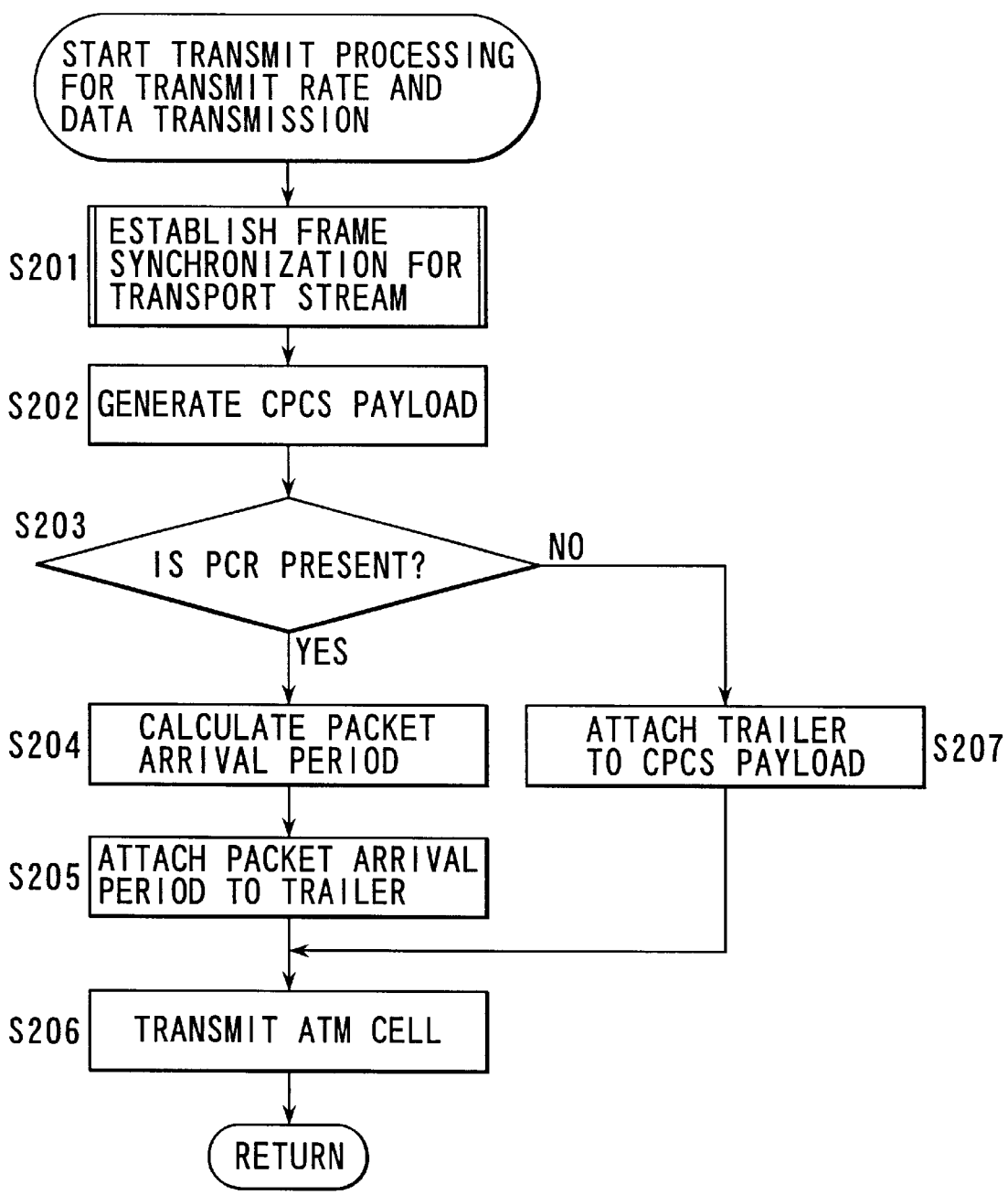
FIG. 22 is a flowchart showing the process for transmitting data and the transmit rate of the transmitter 101 of FIG. 20.

The processing for transmitting the data and transmit rate of the transmitter 101 of FIG. 20 is described while referring to flowchart of FIG. 22. The respective processing of steps S201 through S203 is identical to the respective processing of steps S31 through steps S33 of FIG. 11, so an explanation is omitted here.

In step S203, when determined that a PCR is present in the MPEG transport stream packet 171 contained in the CPCS payload, the process proceeds to step S204. In step S204, based on the current time input from the counter 120, the arrival time of the previous CPCS payload specified by the PCR packet detection signal PCR is stored in the memory 333, and the count of the number of arrived CPCS payloads stored in the memory 333, the transmit rate calculator 331 divides the CPCS payload arrival time specified by the PCR packet detection signal PD by the number of arrived CPCS payloads, and generates a packet arrival period 351 indicating the period of the CPCS-PDU173. The transmit rate calculator 331 stores the CPCS payload arrival time (count value input from the counter 120 at this time) specified by the current PCR packet detection signal PD, in the memory 333.

In step 205, instead of the CRC184, the transmit rate information adder 332 stores the packet arrival period 351 generated by the transmit rate calculator 331 into the trailer 134, generates a CPCS-PDU173, and the operation proceeds to step S206.

In step S203, when determined that a PCR is not present in the MPEG transport stream packet 171 contained in the CPCS payload, the process proceeds to step S207. In step S207, a trailer 174 defined per CS of AAL5 is attached to the CPCS payload supplied from the CPCS payload generator 112, a CPCS-PDU173 is generated, and the operation proceeds to step S206.

The processing for step S206 is the same as the processing for step S35 of FIG. 11 so an explanation is omitted here.

Therefore, as described above, the transmitter 101 stores a packet arrival period 351 in the trailer 341 of CPCS-PDU173 contained in the MPEG transport stream packet 171, and can transmit it as the CPCS payload.

Figure 23:
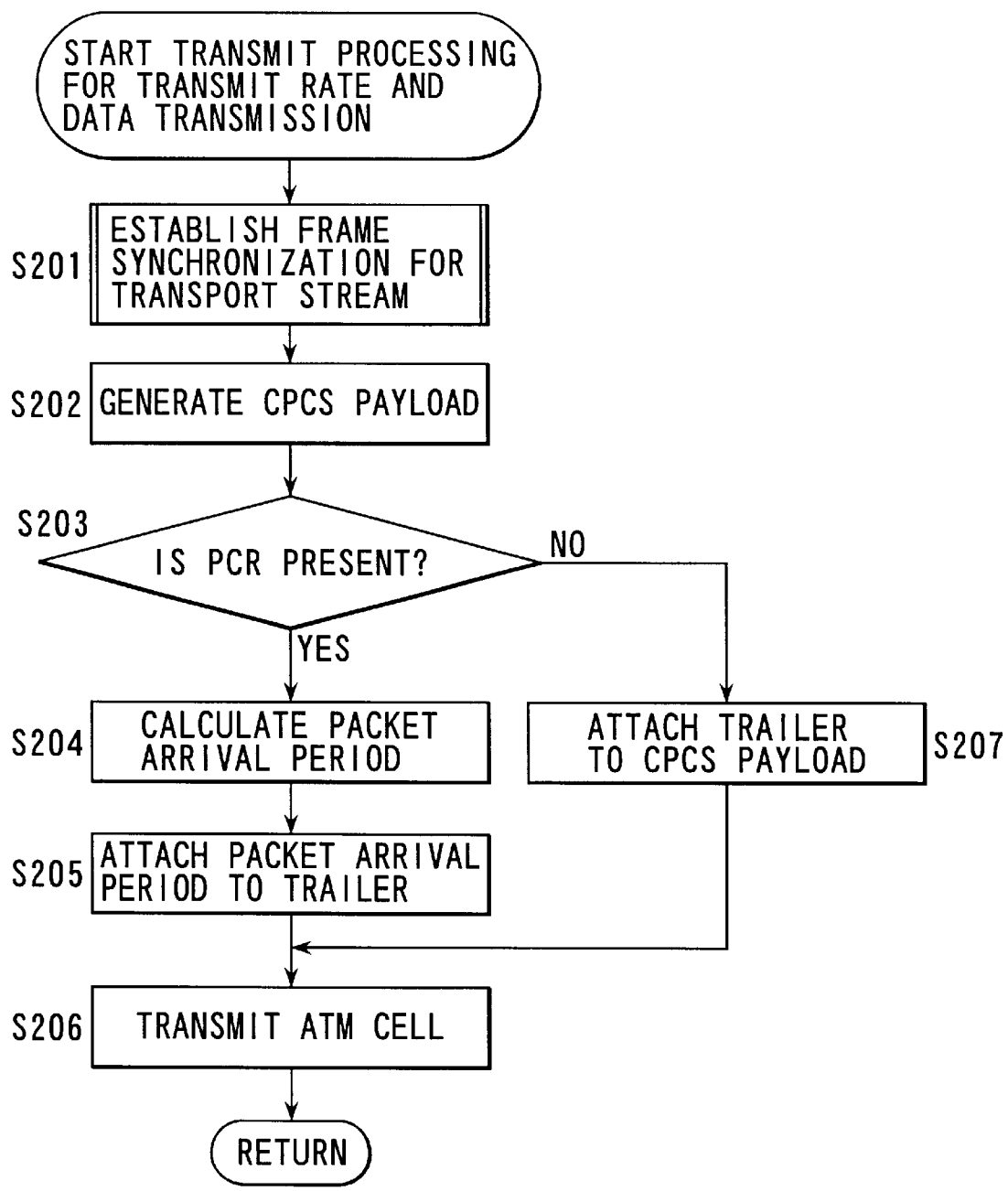
FIG. 23 is a drawing showing another example of the processing of the receiver 103 when changing the transmit rate.

Another embodiment of the receiver 103 when changing the transmit rate is shown in FIG. 23. The ATM interface 301, the CPCS-PDU extractor 304 through selector 307, and the buffer 310 through error report section 312 are the same as in FIG. 15 so an explanation is omitted here.

The transmit rate extractor 371 extracts the packet arrival period 351 from the trailer 341 supplied from the selector 307, and supplies the packet arrival period 351 to the buffer 310. Based on the packet arrival period 351 supplied from the transmit rate extractor 371, the buffer 310 sets a buffer control parameter according to the transmit rate, and outputs the MPEG transport stream packet 171 to a decoder not shown in the drawing.

The receive processing for the receiver 103 of FIG. 23 is identical to the processing described by referring to the flowchart of FIG. 16, except for the synchronizing information and data receive processing of step S104 so an explanation is omitted here. In the receive processing for the receiver 103 of FIG. 23, the process for receiving the data and transmit rate is executed (Of course, in the signaling process, the receiver 103 receives information for sending the transmit rate and data.) instead of the receive processing for the data and synchronizing information of step S104.

Figure 24:
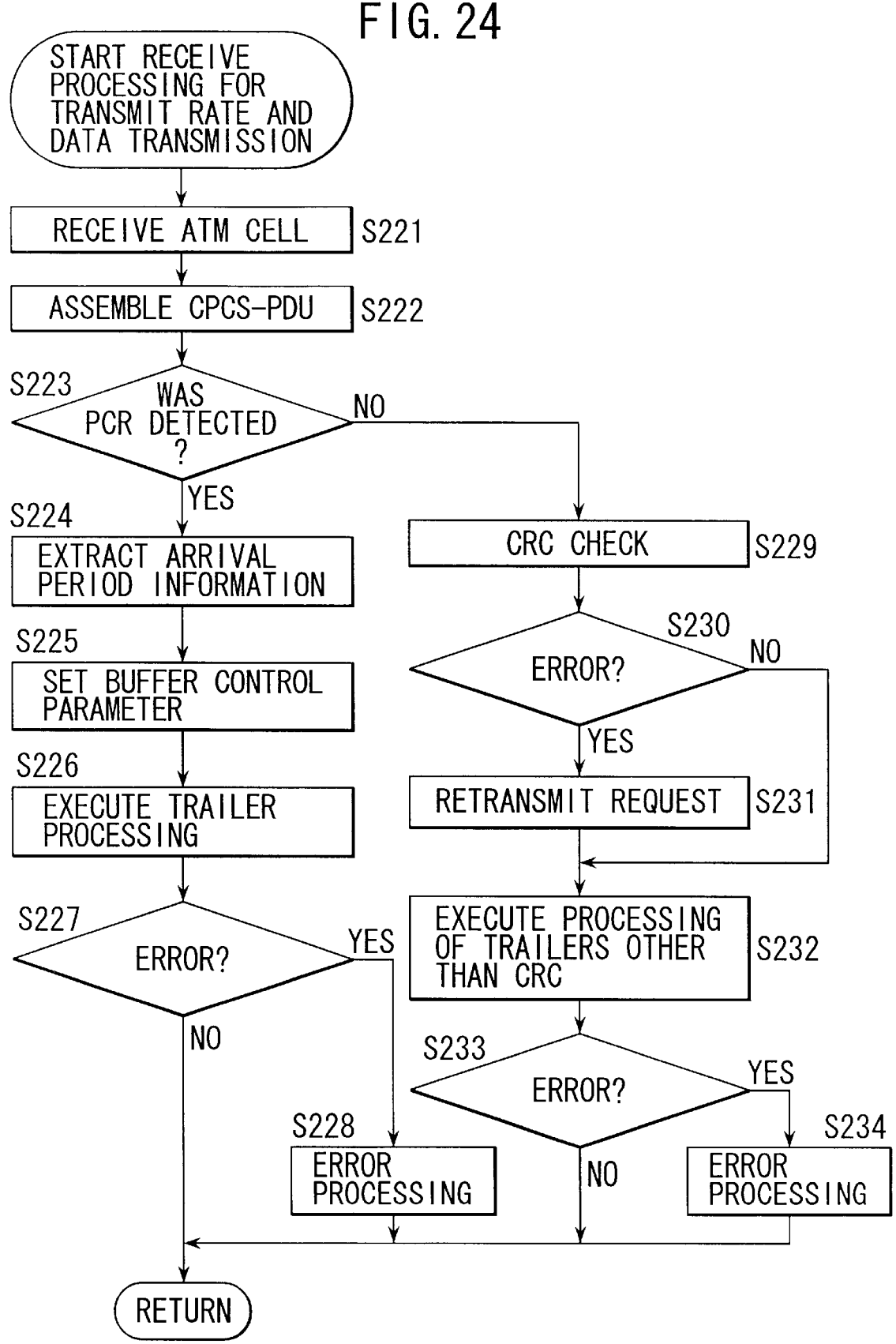
FIG. 24 is a flowchart illustrating the process for receiving data and the transmit rate of the receiver 103 in FIG. 23.

The receive processing for the transmit rate and data of the receiver 103 of FIG. 23 is described while referring to the flowchart of FIG. 24. The respective processing of steps S221 through steps S223 is identical to the respective processing of steps S121 through S123 of FIG. 17 so an explanation is omitted here.

In step S224, the transmit rate extractor 371 extracts the packet arrival period 351 from the trailer supplied from the selector 307, and supplies the packet arrival period 351 to the buffer 310.

In step S225, the buffer 310 sets the parameter for buffer control according to the transmit rate, based on the packet arrival period 351 supplied from the transmit rate extractor 371.

In step S226, the trailer processor 311 executes normal trailer processing based on the trailer 174, and also the trailer 191 contained in CPCS-UU181, CPI182, and the payload length 183. In step S227, the trailer processor 311 checks the validity of the values of the CPI182, and the payload length 183, and determines whether or not an error has occurred. When an error is determined to have occurred, the operation proceeds to step S228, and the error report section 312 performs error processing such as notifying the upper layer, and the processing ends.

In step S227, when an error is determined not to have occurred, the processing ends.

In step S223, when determined that a PCR is not present in the MPEG transport stream packet 171 contained in the CPCS payload, the operation proceeds to step S229, and the trailer processor 311 checks the CRC184 of the trailer 174 of CPCS-PDU173. In step S230, the trailer processor 311 determines by means of the check of CRC184 in step S229 whether or not an error has occurred. The operation proceeds to step S231 when determined that an error has occurred, and the error report section 231 requests re-transmission of the MPEG transport stream packet 171, and the operation proceeds to step S232.

In step S230, when determined that no error has occurred, step 231 is skipped, the operation proceeds to step S232 and except for CRC184 of trailer 174 of CPCS-PDU173, the trailer processor 311 executes trailer processing based on CPCS-UU181, CPI182 or the payload length 183.

In step S233, the trailer 311 checks the validity of the values of CPI182 or the payload length 183, and determines whether or not an error has occurred. When determined that an error has occurred, the operation proceeds to step S234, the error report section 312 executes error processing such as notifying the upper layer, and ends the processing.

In step S233, when determined that an error has not occurred, the processing ends.

The receiver 103 therefore, as described above can rewrite the PCR, utilizing as the CPCS payload, the synchronizing information, in the trailer of the CPCS-PDU173 containing the MPEG transport stream packet 171 having a PCR.

The receiver 103 shown by the structure in FIG. 23 can extract the packet arrival period 351 from the trailer 341 of CPCS-PDU containing the MPEG transport stream packet 171 having the PCR, and can set the buffer control parameter according to the transmit rate.

Therefore, as described above, the transmitter 101 can store the 4 byte synchronizing information and transmit rate in the trailer of the CPCS-PDU173 and transmit this synchronizing information and transmit rate. The receiver 103 can receive the 4 byte synchronizing information and transmit rate stored in the trailer of the CPCS-PDU173 In the above description, the transmitter 101 stores the 4 byte synchronizing information and transmit rate instead of the 4 byte CRC184, in the trailer of the CPCS-PDU173 and transmits this synchronizing information and transmit rate. However the transmitter 101 may also store and transmit the 4 byte synchronizing information instead of the 1 byte CPCS-UU181, 1 byte CPI182 and 2 byte payload length 183; and may also store and transmit the 4 byte transmit rate information instead of the 4 byte CRC184.

The CPCS-UU181 is information transmitted between the CPCS users. Based on the default in the AMS VOD Specification 1.1 in the ATM forum, two MPEG transport stream packets 171 are usually stored in the CPCS-PDU173 as the CPCS-PDU payload, so the payload length 183 will always be set with identical values (cannot be utilized when the CPCS-UU181 was parted). Further, utilization is not stipulated other than when the CPI182 is performing 64 bit alignment of the trailer 174 of CPCS-PDU173. The transmitter 101 can therefore store and transmit synchronizing information and transmit rates instead of the CPCS-UU181, CPI182 and payload length 183.

The above described sequential processing can be implemented with hardware and is also capable of being implemented with software. The sequential processing as implemented by the transmitter 101 and the receiver 103 is described. The sequential processing for implementation by the transmitter 101 and the receiver 103 can be made by computer.

The transmitter 501 of FIG. 25 can be comprised for instance, by a personal computer. A CPU (central processing unit) 511 is connected to an input output interface 516 by way of a bus 515. When the user inputs a command from an input section 518 by means for instance, of a mouse or keyboard, the command is stored on a recording medium such as a ROM (Read Only Memory) 512, a hard disk 514, or on a recording medium such as a magnetic disk 531, optical disk 532, optical-magnetic disk 533 loaded in the drive 520, or transmitted by a means such as an artificial satellite or network, received in the hard disk via a communication section 519, and the stored program then loaded in a RAM (random access memory) 513 and executed by the CPU511. The CPU511 also outputs as needed, the processing results via the input/output interface 516 to a display 517 such as a LCD (liquid crystal display).

The transmit process for implementation by the CPU511 of the program stored in the hard disk 514 and loaded in the RAM513 is described while referring to the flowchart of FIG. 10. Instep S11, the CPU511, based on the procedure as defined in the control brain, implements end-to-end signal processing with the receiver 103, and a long with determining corresponding relationships such as with the virtual channel identifier, transmits to the receiver 103 whether or not to store and transmit the synchronizing information in the AAL5 trailer.

In step S12, the CPU511 determines whether or not to set to synchronizing mode according to the type of data to be transmitted. When decided to set in synchronizing mode, the operation proceeds to step S13 and the CPU511 sets synchronizing mode.

In step S14, the CPU511 transmits the synchronizing information and data by way of the communication section 519.

In step S15, the CPU511 determines whether or not to quit transmitting data according to whether or not un-transmitted data still remains. When the CPU511 decides not to quit transmitting data, the operation returns to step S14 and the process to transmit synchronizing information and data is repeated.

In step S15, when the CPU511 decides to quit transmitting data, the operation proceeds to step S16 and the CPU511 sets the operating mode to normal mode as a default setting, and the processing ends.

In step S12 when decided not to set to synchronous information mode, the operation proceeds to step S17, and the CPU511 sets the operating mode in normal mode.

In step S18, the transmitter 101 transmits the data in normal mode utilizing only the CPCS-PDU173 shown in FIG. 7 and the process ends.

The transmitter 501 in FIG. 25, in this way, implements the transmit processing.

The receiver 103, can be comprised for instance, the same as the transmitter 501 of FIG. 25, by a personal computer. The receiver 103 comprised of a personal computer, implements the receive processing based on a specified program, the same as the transmitter 501 of FIG. 25.

The term system as used in these specifications, signifies the overall device comprised of a plurality of devices or equipment.

In a communication device according to one aspect of the present invention, and a communication method according another aspect of the present invention, a first format data contained in header or trailer is converted to a second format data comprised of control information inserted into a header or trailer for controlling operation of the receiver, and the second format data can be transmitted to the receiver, rendering the effect that information for control exceeding one byte can be transmitted.

In a recording medium according to another aspect of the present invention, a first format data contained in a header or trailer is converted to a second format data comprised of control information inserted into a header or trailer for controlling operation of the receiver, and the second format data can be transmitted to the receiver, rendering the effect that information for control exceeding one byte can be transmitted.

In a communication device according to another aspect of the present invention, and a communication method according to still another aspect of the present invention, a first format data contained in a header or trailer received over a network, is converted to a second format data, control information contained in the header or trailer is detected and the conversion is controlled based on the control information, rendering the effect that information for control exceeding one byte can be received.

In a recording medium according to another aspect of the present invention, a first format data is converted to a second format data, control information contained in the header or trailer detected, and the conversion is controlled based on the control information, rendering the effect that information for control exceeding one byte can be received.

In a communications system according to still another aspect of the present invention, a first format data contained in header or trailer is converted to a second format data comprised of control information inserted into a header or trailer for controlling operation of the receiver, the second format data transmitted to the receiver, second format data contained in a header or trailer received over a network, the second format data converted into a first format data, the control information contained in the header or trailer detected, and the operation of the second conversion means controlled based on the control information, rendering the effect that information for control exceeding one byte can be transmitted or received.

What is claimed is:

1. A communications device for transmitting data to a receiver by way of a network, comprising:

conversion means for converting a first format data to a second format data containing a header or trailer and control information inserted into said header or said trailer for controlling the operation of said receiver; and transmission means for transmitting said second format data to said receiver;

wherein said control information is synchronizing information for controlling synchronization in said receiver; and wherein said first format data is time series data containing time information for each specified timing, and said conversion means generates said synchronizing information based on said time information, and inserts said synchronizing information as said control information into a redundancy information field of said header or trailer of said second format data.

2. A communications device according to claim 1, wherein said transmission means splits up said second format data into a plurality of packets and transmits said plurality of packets.

3. A communications device according to claim 1, wherein said control information is information utilized to convey the transmit rate.

4. A communications method for a communications device for sending data to a receiver by way of a network, comprising:

a conversion step for converting a first format data to a second format data containing a header or trailer and a control information inserted into said header or said trailer for controlling the operation of said receiver; and a transmission step for transmitting said second format data to said receiver;

wherein said control information is synchronizing information for controlling synchronization in said receiver; and wherein said first format data is time series data containing time information for each specified timing, and said conversion step generates said synchronizing information based on said time information, and inserts said synchronizing information as said control information into a redundancy information field of said header or trailer of said second format data.

5. A recording medium recorded with a communications processing program to operate a computer and send data to a receiver by way of a network, wherein said program comprises a conversion step for converting a first format data to a second format data containing a header or trailer and a control information inserted into said header or said trailer for controlling the operation of said receiver;

wherein said control information is synchronizing information for controlling synchronization in said receiver; and wherein said first format data is time series data containing time information for each specified timing, and said program generates said synchronizing information based on said time information, and inserts said synchronizing information as said control information into a redundancy information field of said header or trailer in said second format data.

6. A communications device for receiving data sent from a transmitter over a network comprising:

receive means for receiving from said network a first format data containing a header or a trailer;

conversion means for converting said first format data to second format data;

detection means for detecting a control information contained in said header or said trailer; and control means for controlling the operation of said conversion means based on said control information;

wherein said control information is synchronizing information for controlling synchronization in said receiver; and wherein said first format data is time series data containing time information for each specified timing, and said conversion means generates said synchronizing information based on said time information, and inserts said synchronizing information as said control information into a redundancy information field of said header or trailer in said second format data.

7. A communications device according to claim 6, wherein said receive means receives said first format data split up into a plurality of packets.

8. A communications device according to claim 6, wherein said control information is capable of converting information utilized for conveying the transmit rate.

9. A communications method of a communications device to receive data sent from a transmitter over a network, comprising:

a receive step for receiving from said network a first format data containing a header or a trailer;

a conversion step for converting said first format data to second format data;

a detection step for detecting a control information contained in said header or said trailer; and a control step for controlling the processing in said conversion step based on said control information;

wherein said control information is synchronizing information for controlling synchronization in a receiver of said second format data; and wherein said first format data is time series data containing time information for each specified timing, and said conversion step generates said synchronizing information based on said time information, and inserts said synchronizing information as said control information into a redundancy information field of said header or trailer in said second format data.

10. A recording medium recorded with a communications processing program to operate a computer and receive data sent from a transmitter by way of a network, wherein said program comprises:

a conversion step for converting a first format data to a second format data;

a detection step for detecting a control information contained in said header or said trailer of said first format data; and a control step for controlling the processing in said conversion step based on said control information;

wherein said control information is synchronizing information for controlling synchronization in a receiver of said second format data; and wherein said first format data is time series data containing time information for each specified timing, and said conversion step generates said synchronizing information based on said time information, and inserts said synchronizing information as said control information into a redundancy information field of said header or trailer in said second format data.

11. A communications system comprising a transmitter for transmitting data over a network and a receiver to receive data sent from said transmitter, wherein said transmitter comprises:

first conversion means for converting a first format data containing a header or trailer into a second format data input in said header or trailer with control information to control operation of said receiver, wherein said control information is synchronizing information for controlling synchronization in said receiver, and wherein said first format data is time series data containing time information for each specified timing, and said conversion means generates said synchronizing information based on said time information, and inserts said synchronizing information as said control information into a redundancy information field of said header or trailer in said second format data; and transmission means for transmitting said second format data to said receiver, and said receiver comprises:
 receive means for receiving second format data containing said trailer or said header from said network;
 second conversion means for converting said second format data to said first format data;
 detection means for detecting control information contained in said trailer or said header; and
 control means for controlling the operation of said second conversion means based on said control information.

* * * * *